(12) United States Patent
Tadano et al.

(10) Patent No.: US 11,436,551 B2
(45) Date of Patent: Sep. 6, 2022

(54) TRANSPORTATION OPERATION CONTROL DEVICE, TRANSPORTATION OPERATION CONTROL METHOD, AND RECORDING MEDIUM IN WHICH TRANSPORTATION OPERATION CONTROL PROGRAM IS STORED

(71) Applicant: NEC Corporation, Tokyo (JP)

(72) Inventors: Kumiko Tadano, Tokyo (JP); Yoshiharu Maeno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 233 days.

(21) Appl. No.: 16/754,443

(22) PCT Filed: Oct. 16, 2017

(86) PCT No.: PCT/JP2017/037403
§ 371 (c)(1),
(2) Date: Apr. 8, 2020

(87) PCT Pub. No.: WO2019/077659
PCT Pub. Date: Apr. 25, 2019

(65) Prior Publication Data
US 2021/0201248 A1 Jul. 1, 2021

(51) Int. Cl.
*G06Q 10/08* (2012.01)
*G05B 19/418* (2006.01)
*G06Q 10/06* (2012.01)

(52) U.S. Cl.
CPC ....... *G06Q 10/083* (2013.01); *G05B 19/4189* (2013.01); *G06Q 10/06* (2013.01)

(58) Field of Classification Search
CPC ... G06Q 10/083; G06Q 10/06; G05B 19/4189
(Continued)

(56) References Cited

U.S. PATENT DOCUMENTS

| | | | |
|---|---|---|---|
| 2012/0278204 A1* | 11/2012 | Urano | G06Q 10/08 705/28 |
| 2018/0137593 A1* | 5/2018 | Djuric | G06Q 50/30 |
| 2018/0165586 A1* | 6/2018 | Saxena | G06N 20/20 |

FOREIGN PATENT DOCUMENTS

| | | |
|---|---|---|
| JP | H03-231313 A | 10/1991 |
| JP | H05-267431 A | 10/1993 |

(Continued)

OTHER PUBLICATIONS

"Transportation Cost and Benefit Analysis" Published by Todd Alexander Litman Vistoria Transport Policy Institute (Year: 2009).*

(Continued)

*Primary Examiner* — Zeina Elchanti
(74) *Attorney, Agent, or Firm* — Sughrue Mion, PLLC

(57) ABSTRACT

This transportation operation control device includes: a transportation cost acquisition unit that acquires a transportation cost obtained from a transportation operation for transporting an article to a transportation destination site from a transportation source site among a plurality of sites, the transportation cost being acquired in association with the combination between the transportation source site and the transportation destination site; a correction unit that calculates a corrected cost obtained by correcting the transportation cost on the basis of information indicating the reliability related to the transportation cost; a presence status acquisition unit that acquires presence status information indicating a presence status of the article between the transportation source site and the transportation destination site; and a calculation unit that calculates the importance degree of the transportation operation relative to the combination on the basis of the presence status information and the corrected cost.

20 Claims, 15 Drawing Sheets

(58) Field of Classification Search
USPC .......................................................... 705/330
See application file for complete search history.

(56) References Cited

FOREIGN PATENT DOCUMENTS

| | | |
|---|---|---|
| JP | 2010-028090 A | 2/2010 |
| JP | 2011-102166 A | 5/2011 |
| JP | 2013-141406 A | 7/2013 |
| WO | 2015/111224 A1 | 7/2015 |

OTHER PUBLICATIONS

International Search Report for PCT Application No. PCT/JP2017/037403, dated Nov. 21, 2017.
English translation of Written opinion for PCT Application No. PCT/JP2017/037403.

* cited by examiner

Fig. 3

161 WS LINK MANAGEMENT TABLE

| LINK IDENTIFIER | TRANSPORTATION SOURCE WS IDENTIFIER | TRANSPORTATION DESTINATION WS IDENTIFIER |
|---|---|---|
| x1y1 | $WS_{x1}$ | $WS_{y1}$ |
| x1y2 | $WS_{x1}$ | $WS_{y2}$ |
| x1y3 | $WS_{x1}$ | $WS_{y3}$ |
| x2y1 | $WS_{x2}$ | $WS_{y1}$ |
| x2y2 | $WS_{x2}$ | $WS_{y2}$ |
| x2y3 | $WS_{x2}$ | $WS_{y3}$ |
| y1z1 | $WS_{y1}$ | $WS_{z1}$ |
| y2z1 | $WS_{y2}$ | $WS_{z1}$ |
| y3z1 | $WS_{y3}$ | $WS_{z1}$ |

Fig. 4

162 TRANSPORTATION COST IDENTIFIER MANAGEMENT TABLE

| TRANSPORTATION COST IDENTIFIER | TRANSPORTATION SOURCE WS IDENTIFIER | TRANSPORTATION DESTINATION WS IDENTIFIER | NOTE |
| --- | --- | --- | --- |
| $C_{x1x1}$ | $WS_{x1}$ | $WS_{x1}$ | COST FOR MOVEMENT FROM INPUT BUFFER OF $WS_{x1}$ TO OUTPUT BUFFER OF $WS_{x1}$ |
| $C_{x1x2}$ | $WS_{x1}$ | $WS_{x2}$ | COST FOR MOVEMENT FROM INPUT BUFFER OF $WS_{x1}$ TO OUTPUT BUFFER OF $WS_{x2}$ |
| $C_{x1y1}$ | $WS_{x1}$ | $WS_{y1}$ | COST FOR MOVEMENT FROM INPUT BUFFER OF $WS_{x1}$ TO OUTPUT BUFFER OF $WS_{y1}$ |
| $C_{x1y2}$ | $WS_{x1}$ | $WS_{y2}$ | COST FOR MOVEMENT FROM INPUT BUFFER OF $WS_{x1}$ TO OUTPUT BUFFER OF $WS_{y2}$ |
| $C_{x1y3}$ | $WS_{x1}$ | $WS_{y3}$ | COST FOR MOVEMENT FROM INPUT BUFFER OF $WS_{x1}$ TO OUTPUT BUFFER OF $WS_{y3}$ |

Fig. 5

163 TRANSPORTATION COST MEASUREMENT MANAGEMENT TABLE

| MEASUREMENT TIME POINT | TRANSPORTATION COST IDENTIFIER | TRANSPORTATION COST |
|---|---|---|
| 11:23 | $C_{x1x1}$ | 1.2 |
| 11:20 | $C_{x1y3}$ | 2.6 |
| 10:55 | $C_{x1y1}$ | 4.9 |
| 10:54 | $C_{x1y2}$ | 3.5 |
| ⋮ | ⋮ | ⋮ |

Fig. 6

164 TRANSPORTATION COST

| TRANSPORTATION COST IDENTIFIER | AVERAGE OF TRANSPORTATION COST | AVERAGE ELAPSED TIME FROM MEASUREMENT TIME POINT TO CURRENT TIME POINT | NUMBER OF MEASUREMENT SAMPLES DURING PREDETERMINED PERIOD | CORRECTED COST | RATIO OF REDUCTION IN CORRECTED COST TO TRANSPORTATION COST |
|---|---|---|---|---|---|
| $c_{x1x1}$ | 1.25 | 50 MIN. ELAPSED | 5 | 1 | 0.2 |
| $c_{x1x2}$ | 2.5 | 50 MIN. ELAPSED | 5 | 2 | 0.2 |
| $c_{x1y1}$ | 5 | 50 MIN. ELAPSED | 5 | 4 | 0.2 |
| $c_{x1y2}$ | 4 | 75 MIN. ELAPSED | 5 | 3 | 0.25 |
| $c_{x1y3}$ | 2.5 | 50 MIN. ELAPSED | 1 | 1.8 | 0.28 |

Fig. 7

165 BUFFER MANAGEMENT TABLE

| BUFFER IDENTIFIER | BUFFER USAGE RATE |
|---|---|
| $I_{x1}$ | 80 |
| $O_{x1}$ | 100 |
| $I_{x2}$ | 80 |
| $O_{x2}$ | 100 |
| $I_{y1}$ | 90 |
| $O_{y1}$ | 100 |
| $I_{y2}$ | 90 |
| $O_{y2}$ | 80 |
| $I_{y3}$ | 90 |
| $O_{y3}$ | 70 |
| $I_{z1}$ | 50 |
| $O_{z1}$ | 10 |

Fig. 8

166 IMPORTANCE DEGREE MANAGEMENT TABLE

| LINK IDENTIFIER | CALCULATION FORMULA | IMPORTANCE DEGREE OF TRANSPORTATION OPERATION |
|---|---|---|
| x1y1 | $\dfrac{O_{x1} - I_{y1}}{C'_{x1x1}} = \dfrac{100 - 90}{1}$ | 10 |
| x1y2 | $\dfrac{O_{x1} - I_{y2}}{C'_{x1x1}} = \dfrac{100 - 90}{1}$ | 10 |
| x1y3 | $\dfrac{O_{x1} - I_{y3}}{C'_{x1x1}} = \dfrac{100 - 90}{1}$ | 10 |
| x2y1 | $\dfrac{O_{x2} - I_{y1}}{C'_{x1x2}} = \dfrac{100 - 90}{2}$ | 5 |
| x2y2 | $\dfrac{O_{x2} - I_{y2}}{C'_{x1x2}} = \dfrac{100 - 90}{2}$ | 5 |
| x2y3 | $\dfrac{O_{x2} - I_{y3}}{C'_{x1x2}} = \dfrac{100 - 90}{2}$ | 5 |
| y1z1 | $\dfrac{O_{y1} - I_{z1}}{C'_{x1y1}} = \dfrac{100 - 50}{4}$ | 12.5 |
| y2z1 | $\dfrac{O_{y2} - I_{z1}}{C'_{x1y2}} = \dfrac{80 - 50}{3}$ | 10 |
| y3z1 | $\dfrac{O_{y3} - I_{z1}}{C'_{x1y3}} = \dfrac{70 - 50}{1.8}$ | 11.1 |

↓ IMPORTANCE DEGREE IS GREATEST

Fig. 10

162a TRANSPORTATION COST IDENTIFIER MANAGEMENT TABLE

| TRANSPORTATION COST IDENTIFIER | LINK IDENTIFIER | NOTE |
|---|---|---|
| $C_{x1y1}$ | x1y1 | COST FOR TRANSPORTATION FROM INPUT BUFFER OF $WS_{x1}$ TO OUTPUT BUFFER OF $WS_{y1}$ |
| $C_{x1y2}$ | x1y2 | COST FOR TRANSPORTATION FROM INPUT BUFFER OF $WS_{x1}$ TO OUTPUT BUFFER OF $WS_{y2}$ |
| $C_{x1y3}$ | x1y3 | COST FOR TRANSPORTATION FROM INPUT BUFFER OF $WS_{x1}$ TO OUTPUT BUFFER OF $WS_{y3}$ |
| $C_{x2y1}$ | x2y1 | COST FOR TRANSPORTATION FROM INPUT BUFFER OF $WS_{x2}$ TO OUTPUT BUFFER OF $WS_{y1}$ |
| $C_{x2y2}$ | x2y2 | COST FOR TRANSPORTATION FROM INPUT BUFFER OF $WS_{x2}$ TO OUTPUT BUFFER OF $WS_{y2}$ |
| $C_{x2y3}$ | x2y3 | COST FOR TRANSPORTATION FROM INPUT BUFFER OF $WS_{x2}$ TO OUTPUT BUFFER OF $WS_{y3}$ |
| $C_{y1z1}$ | y1z1 | COST FOR TRANSPORTATION FROM INPUT BUFFER OF $WS_{y1}$ TO OUTPUT BUFFER OF $WS_{z1}$ |
| $C_{y2z1}$ | y2z1 | COST FOR TRANSPORTATION FROM INPUT BUFFER OF $WS_{y2}$ TO OUTPUT BUFFER OF $WS_{z1}$ |
| $C_{y3z1}$ | y3z1 | COST FOR TRANSPORTATION FROM INPUT BUFFER OF $WS_{y3}$ TO OUTPUT BUFFER OF $WS_{z1}$ |

Fig. 11

163a TRANSPORTATION COST MEASUREMENT MANAGEMENT TABLE

| MEASUREMENT TIME POINT | TRANSPORTATION COST IDENTIFIER | TRANSPORTATION COST |
|---|---|---|
| 14:35 | $C_{x1y1}$ | 2.4 |
| 14:32 | $C_{x1y2}$ | 5.2 |
| 13:46 | $C_{x1y3}$ | 9.8 |
| 13:42 | $C_{x2y1}$ | 7.0 |
| ⋮ | ⋮ | ⋮ |

Fig. 12

164a CORRECTED COST MANAGEMENT TABLE

| TRANSPORTATION COST IDENTIFIER | AVERAGE OF TRANSPORTATION COST | AVERAGE ELAPSED TIME FROM MEASUREMENT TIME POINT TO CURRENT TIME POINT | NUMBER OF MEASUREMENT SAMPLES DURING PREDETERMINED PERIOD | CORRECTED COST | RATIO OF REDUCTION IN CORRECTED COST TO TRANSPORTATION COST |
|---|---|---|---|---|---|
| $C_{x1y1}$ | 1.25 | 50 MIN. ELAPSED | 5 | 1 | 0.2 |
| $C_{x1y2}$ | 2.5 | 50 MIN. ELAPSED | 5 | 2 | 0.2 |
| $C_{x1y3}$ | 5 | 50 MIN. ELAPSED | 5 | 4 | 0.2 |
| $C_{x2y1}$ | 4 | 75 MIN. ELAPSED | 5 | 3 | 0.25 |
| $C_{x2y2}$ | 2.5 | 50 MIN. ELAPSED | 1 | 1.8 | 0.28 |
| $C_{x2y3}$ | 1.25 | 50 MIN. ELAPSED | 5 | 1 | 0.2 |
| $C_{y1z1}$ | 2.5 | 50 MIN. ELAPSED | 5 | 2 | 0.2 |
| $C_{y2z1}$ | 1.25 | 50 MIN. ELAPSED | 5 | 1 | 0.2 |
| $C_{y3z1}$ | 2.5 | 50 MIN. ELAPSED | 5 | 2 | 0.2 |

Fig. 13

166a IMPORTANCE DEGREE MANAGEMENT TABLE

| LINK IDENTIFIER | CALCULATION FORMULA | IMPORTANCE DEGREE OF TRANSPORTATION OPERATION |
|---|---|---|
| x1y1 | $\dfrac{O_{x1} - I_{y1}}{C'_{x1y1}} = \dfrac{100 - 90}{1}$ | 10 |
| x1y2 | $\dfrac{O_{x1} - I_{y2}}{C'_{x1y2}} = \dfrac{100 - 90}{2}$ | 5 |
| x1y3 | $\dfrac{O_{x1} - I_{y3}}{C'_{x1y3}} = \dfrac{100 - 90}{4}$ | 2.5 |
| x2y1 | $\dfrac{O_{x2} - I_{y1}}{C'_{x2y1}} = \dfrac{100 - 90}{3}$ | 3.3 |
| x2y2 | $\dfrac{O_{x2} - I_{y2}}{C'_{x2y2}} = \dfrac{100 - 90}{1.8}$ | 5.6 |
| x2y3 | $\dfrac{O_{x2} - I_{y3}}{C'_{x2y3}} = \dfrac{100 - 90}{1}$ | 10 |
| y1z1 | $\dfrac{O_{y1} - I_{z1}}{C'_{y1z1}} = \dfrac{100 - 50}{2}$ | 25 |
| y2z1 | $\dfrac{O_{y2} - I_{z1}}{C'_{y2z1}} = \dfrac{80 - 50}{1}$ | 30 ← IMPORTANCE DEGREE IS GREATEST |
| y3z1 | $\dfrac{O_{y3} - I_{z1}}{C'_{y3z1}} = \dfrac{70 - 50}{2}$ | 10 |

TRANSPORTATION OPERATION CONTROL DEVICE, TRANSPORTATION OPERATION CONTROL METHOD, AND RECORDING MEDIUM IN WHICH TRANSPORTATION OPERATION CONTROL PROGRAM IS STORED

This application is a National Stage Entry of PCT/JP2017/037403 filed on Oct. 16, 2017, the contents of all of which are incorporated herein by reference, in their entirety.

TECHNICAL FIELD

The present invention relates to a technology for, with respect to a series of production operations and the like including a plurality of operations (work processes) that are performed in a factory or the like, controlling transportation of articles among sites where the operations are performed.

BACKGROUND ART

A structure that achieves a series of production operations including a plurality of operations (work processes) that are performed in a factory or the like can be considered as a set of a plurality of sites (in the present application, hereinafter, referred to as workstations (WSs)) where processing, such as production and inspection, is performed. An actual workstation is, for example, a work cell or a facility (shop) that is constituted by grouping machines (apparatuses) or the like each of which has a specific function.

A workstation often includes an input buffer, a processing unit, and an output buffer. The processing unit has a function (constituent element) of performing one of production, inspection, packing, and the like. The input buffer and the output buffer have a function of storing an inventory of articles (work-in-processes, parts, products, and the like).

The workstation performs a series of operations, such as production and inspection, on articles stored in the input buffer and stores processed articles in the output buffer. A transportation operator, a transportation device (transportation vehicle), or the like takes out an article from the output buffer of a workstation to serve as a transportation origin and transports the article to the input buffer of a workstation to serve as a transportation destination. The transportation operator or the transportation device stores the article in the input buffer of the workstation serving as a transportation destination.

On this occasion, when, for example, the speed of transportation of articles is too fast or too slow, a spatial lack of balance relating to articles stored in buffers (that is, an imbalance in usage rates between the output buffer of a workstation to serve as a transportation origin and the input buffer of a workstation to serve as a transportation destination) occurs. The imbalance is an inappropriate difference or an inappropriate ratio relating to usage rates of both buffers or a usage rate of at least one of the buffers being equal to or greater than a threshold value or equal to or less than a threshold value. In the present application, hereinafter, such an event is referred to as imbalance of buffers.

When an imbalance of buffers occurs, a load may concentrate locally on a specific operation process (work process) or transportation operation. Alternatively, conversely to the above, in such a case, useless waiting time may occur to a transportation operator, a transportation device, a production operator, a production device, or the like to which an operation has been allocated or rearrangement of such operators and devices may become necessary. As a result, efficient, stable production and transportation in the entire factory or warehouse may be inhibited. Therefore, expectations have been rising for a technology capable of controlling transportation operations between buffers in such a way as to, in an environment in which transportation resources (transportation operators, transportation vehicles, or the like) are limited, appropriately reduce buffer imbalance between workstations in order to improve processing capability in the entire factory or warehouse.

As a technology related to such the above-described technology, PTL 1 discloses an automated transportation system that sets an optimum transportation route between a transportation origin and a transportation destination. The system includes a database storing a cost table. The system calculates present facility costs of transportation facilities by multiplying standard facility costs according to standard operation performances of the transportation facilities by weighting values according to present operation statuses of the transportation facilities and sets the calculated present facility costs in the cost table. The system calculates a transportation cost obtained by summing up present facility costs of the transportation facilities with respect to each route and sets the transportation costs in the cost table. The system selects, among a plurality of routes the transportation origins and transportation destinations of which respectively coincide with each other (transportation route candidates), a transportation route candidate with tanking the smallest transportation cost as a transportation route.

PTL 2 discloses a processing facility that includes a plurality of transportation routes among a plurality of processing apparatuses. The processing facility calculates weights for each of waiting times of objects to be transported at points of time, states of loads on processing apparatuses at transportation origins and transportation destinations, states of loads of objects to be transported in the entire transportation area, and states of loads on transportation means. The processing facility controls the transportation means by calculating a degree of priority of transportation processing with weights varied according to a status in the transportation area and thereby determining which object to be transported should be transported to which processing apparatus.

PTL 3 discloses a delivery schedule selection system with the aim of improvement in convenience for users and efficient delivery. The system acquires package information and extracts a plurality of selectable delivery schedule candidates for delivering a package from a sender to a destination. The system acquires delivery schedules of other packages. The system calculates, with respect to each delivery schedule candidate, a delivery cost, based on the delivery schedules of other packages or the delivery schedules of other packages and delivery schedules predicted to be added or canceled in the future. The system presents at least one or more delivery schedule candidates to a user on the sender side or receiver side of the package, based on the delivery costs. The system determines a delivery schedule selected by the user out of the delivery schedule candidates as a delivery schedule of the package.

PTL 4 discloses a control system that stabilizes an electric power system by appropriately controlling the amount of power supply from power plants at the time of an accident or a malfunction of the electric power system. The system evaluates reliability of measurement data at points of time at which sampling is performed and, based thereon, changes a degree of influence of the measurement data on estimation calculation. When estimating a power phase angle difference curve by applying a regression analysis method to pieces of information on power generator output and power generator phase angles, which are calculated using data obtained from the electric power system, the system performs the estimation while decreasing a value of a weighting coefficient given to data having low reliability.

CITATION LIST

Patent Literature

[PTL 1] JP 2011-102166 A
[PTL 2] JP 2010-28090 A
[PTL 3] WO 2015/111224 A
[PTL 4] JP 2013-141406 A

SUMMARY OF INVENTION

Technical Problem

The above-described costs required for transportation operations between workstations (in the present application, hereinafter, referred to as transportation costs) dynamically change depending on various factors. Factors of dynamic change of transportation costs include, for example, the followings.
- Since transportation operation is dependent on individual skills, transportation costs change depending on transportation capability of operators (for example, transportation costs change depending on degrees of proficiency of the operators and combinations of the operators belonging to operation teams) or degrees of fatigue of the operators (for example, the degree of concentration on an operation decreases as time elapses from the start of the operation).
- In a factory in which types of products and the amount of production of the products frequently change or a warehouse in which a large number of types of articles are stored, details of transportation operation (the types and amount of products, transportation methods, transportation routes, degrees of interference on transportation routes, competition between transportation resources, and the like) frequently change.
- Instability in the amount of articles accumulating in the buffers of workstations causes transportation loads to change frequently and substantially. Examples of this case include a case where, because of frequent production of new products or efforts required for or inexperience in changes in processes in response to change of demand, fluctuation relating to processing speed of the processes may occur. Alternatively, such examples include a case where production is performed in an environment in which apparatuses are forced to be suspended frequently because safety margin is set to be inappropriately large for the purpose of quality assurance or a case where unpredictable suspension is likely to occur due to use of an apparatus the availability of which is low.

When transportation costs, which, as described above, depend on transportation capability, temporally or spatially change dynamically (fluctuation is large), in order to avoid inappropriately controlling transportation operations, based on transportation costs that are inaccurate (have low reliability), it is required to perceive (identify) present transportation costs accurately. To that end, it is required to measure present transportation costs accurately.

However, when, for example, measuring present transportation costs accurately is prioritized, there is a problem in that there is a possibility that increase in a cost required for measuring the transportation costs (for example, expense and time required for transportation operations for measurement that involve moving transportation resources to distant places) causes efficiency in production processing and transportation processing in the factory or the like to be reduced. That is, the inventors have found that it is a problem to be solved to, without reducing transportation efficiency of articles in a factory or the like, surely perform transportation control that can flexibly respond to dynamically changing transportation costs. PTLs 1 to 4 fail to mention about the problem. A principal object of the present invention is to provide transportation operation control and the like that solves the problem.

Solution to Problem

A transportation operation control device according to one aspect of the present invention includes a transportation cost acquisition means for acquiring a transportation cost in association with a combination of a transportation source site and a transportation destination site, the transportation cost being obtained from a transportation operation of transporting an article from a transportation source site to a transportation destination site among a plurality of sites, a correction means for calculating, based on information representing reliability relating to the transportation cost, a corrected cost obtained by correcting the transportation cost, a presence status acquisition means for acquiring presence status information representing presence statuses of the articles at the transportation source site and the transportation destination site, and a calculation means for calculating a importance degree of the transportation operation for the combination, based on the presence status information and the corrected cost.

In another aspect of achieving the above-described object, a transportation operation control method according to one aspect of the present invention includes an information processing device performing acquiring a transportation cost in association with a combination of the transportation source site and the transportation destination site, the transportation cost being obtained from a transportation operation of transporting an article from a transportation source site to a transportation destination site among a plurality of sites, calculating, based on information representing reliability relating to the transportation cost, a corrected cost obtained by correcting the transportation cost, acquiring presence status information representing presence statuses of the articles at the transportation source site and the transportation destination site, and calculating a importance degree of the transportation operation for the combination, based on the presence status information and the corrected cost.

In still another aspect of achieving the above-described object, a transportation operation control program according to one aspect of the present invention is a program causing a computer to execute transportation cost acquisition processing of acquiring a transportation cost in association with a combination of the transportation source site and the transportation destination site, the transportation cost being obtained from a transportation operation of transporting an article from a transportation source site to a transportation destination site among a plurality of sites, correction processing of calculating, based on information representing reliability relating to the transportation cost, a corrected cost obtained by correcting the transportation cost, presence status acquisition processing of acquiring presence status information representing presence statuses of the articles at the transportation source site and the transportation destination site, and calculation processing of calculating a importance degree of the transportation operation for the combination, based on the presence status information and the corrected cost.

Further, the present invention can also be achieved by a computer-readable nonvolatile recording medium in which the above-described transportation operation control program (computer program) is stored.

Advantageous Effects of Invention

The present invention can achieve avoidance of reduction in transportation efficiency of articles in a factory or the like and also achieve transportation control that can flexibly respond to dynamically changing transportation costs.

BRIEF DESCRIPTION OF DRAWINGS

FIG. 3 is a diagram exemplifying a configuration of a WS link management table 161 according to the first example embodiment of the present invention;

FIG. 4 is a diagram exemplifying a configuration of a transportation cost identifier management table 162 according to the first example embodiment of the present invention;

FIG. 5 is a diagram exemplifying a configuration of a transportation cost measurement management table 163 according to the first example embodiment of the present invention;

FIG. 6 is a diagram exemplifying a configuration of a corrected cost management table 164 according to the first example embodiment of the present invention;

FIG. 7 is a diagram exemplifying a configuration of a buffer management table 165 according to the first example embodiment of the present invention;

FIG. 8 is a diagram exemplifying a configuration of an importance degree management table 166 according to the first example embodiment of the present invention;

FIG. 10 is a diagram exemplifying a configuration of a transportation cost identifier management table 162a according to a variation of the first example embodiment of the present invention;

FIG. 11 is a diagram exemplifying a configuration of a transportation cost measurement management table 163a according to the variation of the first example embodiment of the present invention;

FIG. 12 is a diagram exemplifying a configuration of a corrected cost management table 164a according to the variation of the first example embodiment of the present invention;

FIG. 13 is a diagram exemplifying a configuration of an importance degree management table 166a according to the variation of the first example embodiment of the present invention;

EXAMPLE EMBODIMENT

Hereinafter, example embodiments of the present invention will be described in detail with reference to the drawings.

First Example Embodiment

Figure 1:
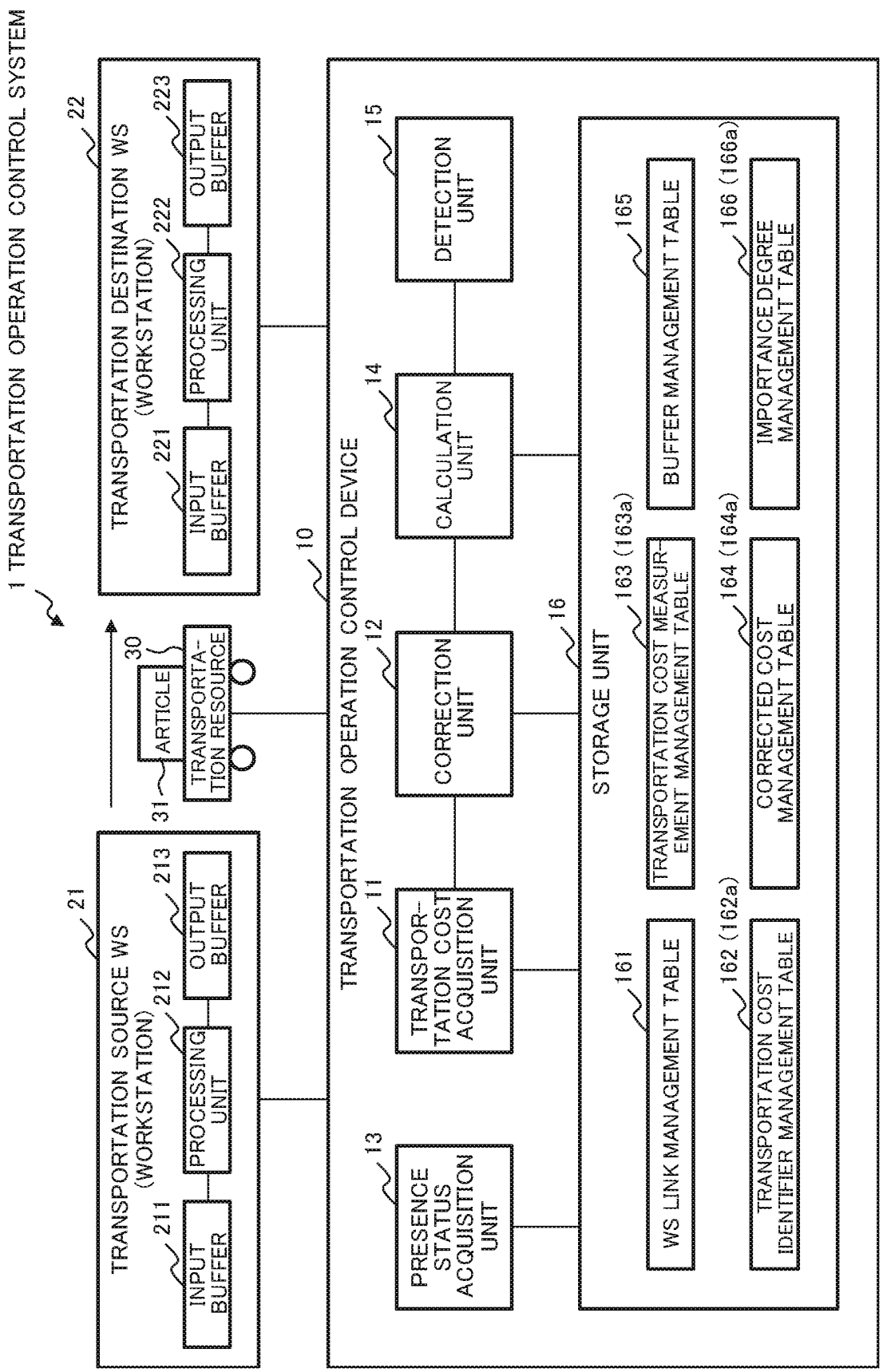
FIG. 1 is a block diagram illustrating a configuration of a transportation operation control system 1 according to a first example embodiment of the present invention.

FIG. 1 is a block diagram conceptually illustrating a configuration of a transportation operation control system 1 according to a first example embodiment of the present invention. FIG. 1 will also be referred to in a description of a transportation operation control system 1 according to a variation of the first example embodiment, which will be described later. The transportation operation control system 1 according to the present example embodiment is a system that, with respect to production operations and the like that are performed in a factory or the like and that include a plurality of operations (work processes), controls transportation of articles among sites (workstations (WSs)) that perform the operations. A WS is, for example, an operation cell or a shop that is constituted by grouping apparatuses each of which has a specific function.

The transportation operation control system 1 includes, when roughly divided, a transportation operation control device 10 and a transportation resource 30. The transportation resource 30 is connected to the transportation operation control device 10 in a communicable manner and transports an article 31 from a transportation source WS 21 to a transportation destination WS 22 under control of the transportation operation control device 10. The transportation resource 30 is, for example, a transportation device, such as a transportation vehicle, that is capable of transporting the article 31.

When, for example, an operator performs a transportation operation while on board a transportation vehicle, the transportation resource 30 is the transportation vehicle, and the transportation vehicle presents, to the operator, information indicating details of the transportation operation received from the transportation operation control device 10, using an image, a sound, or the like. When an operator performs transportation without using a transportation vehicle, the transportation resource 30 is equivalent to the operator and a terminal device that presents information indicating a transportation operation to the operator. When an unmanned automatic transportation vehicle performs a transportation operation, the transportation resource 30 is the unmanned automatic transportation vehicle, and the unmanned automatic transportation vehicle performs the transportation operation in accordance with information indicating details of the transportation operation received from the transportation operation control device 10. The information indicating details of a transportation operation transmitted from the transportation operation control device 10 may be displayed on a display device or the like installed on the transportation source WS 21 and the transportation destination WS 22.

The transportation source WS 21 and the transportation destination WS 22 are sites that perform operations, such as production and inspection. The transportation source WS 21 includes an input buffer 211, a processing unit 212, and an output buffer 213. The transportation destination WS 22 includes an input buffer 221, a processing unit 222, and an output buffer 223.

Each of the processing units 212 and 222 has a function of performing an operation (work process), such as production, inspection, and packing, on an article 31. Each of the processing units 212 and 222 can be achieved by at least either an apparatus or an operator. Each of the input buffers 211 and 221 has a function of storing an article 31 that is in a state of waiting for being processed by the processing unit 212 or 222 in the transportation source WS 21 or the transportation destination WS 22. Each of the output buffers 213 and 223 has a function of storing an article 31 that is in a state of, after having been processed by the processing unit 212 or 212, waiting for being transported by the transportation resource 30 in the transportation source WS 21 or the transportation destination WS 22.

Although, in FIG. 1, for convenience of description, one transportation source WS 21, one transportation destination WS 22, and one transportation resource 30 are illustrated, it is assumed that the transportation operation control system 1 according to the present example embodiment includes a large number of workstations as transportation source WSs 21 or transportation destination WSs 22 and has a large number of combinations of a transportation source WS 21 and a transportation destination WS 22. The transportation operation control system 1 may also include a plurality of transportation resources 30 that transport articles in parallel between workstations included in such combinations of workstations.

The transportation operation control device 10 of the present example embodiment controls transportation operations in each of which an article 31 is transported from a transportation source WS 21 to a transportation destination WS 22 by a transportation resource 30. The transportation operation control device 10 is capable of controlling the plurality of transportation resources 30 that transport articles 31 in parallel among the large number of workstations.

The transportation operation control device 10 includes a transportation cost acquisition unit 11, a correction unit 12, a presence status acquisition unit 13, a calculation unit 14, a detection unit 15, and a storage unit 16.

The storage unit 16 is a storage device, such as a magnetic disk and an electronic memory. The storage unit 16 stores a WS link management table 161, a transportation cost identifier management table 162, a transportation cost measurement management table 163, a corrected cost management table 164, a buffer management table 165, and an importance degree management table 166. Details of the information stored in the storage unit 16 will be described later.

The transportation cost acquisition unit 11 acquires a transportation cost required for a transportation resource 30 to transport an article 31 from a transportation source WS 21 to a transportation destination WS 22 in association with a combination of the transportation source WS 21 and the transportation destination WS 22. The transportation cost acquisition unit 11 may acquire transportation costs from the transportation resources 30 or an external device (not illustrated) capable of measuring transportation costs through transportation operations or may have a function of measuring the transportation costs. However, specifically, the transportation cost is information indicating, for example, time required for transportation, transportation distance, the number of operators required for transportation, the number of used transportation vehicles, such as an automated guided vehicle (AGV) and a forklift, or the types and amount of used resources, such as an elevator and a crane. The transportation cost can be acquired through, for example, sensors attached to operators and transportation vehicles, reading of tags attached to articles 31, timers, or information input into the system by operators.

The correction unit 12 calculates a corrected cost obtained by correcting a transportation cost, which is acquired by the transportation cost acquisition unit 11 after a transportation operation of a transportation resource 30 transporting an article 31 from a transportation source WS 21 to a transportation destination WS 22 has been completed, based on information representing reliability relating to the transportation cost. The lower is reliability relating to the transportation cost, the higher the transportation operation control device 10 according to the present example embodiment sets a degree of priority of updating the transportation cost (that is, acquiring measurement data of the transportation cost). Meanwhile, the higher transportation cost a transportation operation has, the lower the transportation operation control device 10 sets a importance degree (a degree of priority for execution) of the transportation operation. Therefore, the lower is reliability of a transportation cost relating to a transportation operation, the lower the correction unit 12 calculates a corrected cost of the transportation cost to be in order to raise the importance degree of the transportation operation.

The correction unit 12 can use, as the above-described information representing reliability relating to a transportation cost, information on, for example, the followings:

the number of times of measurement of the transportation cost (the number of measured samples is equal to or less than a criterion number, the number of measured samples is comparatively small compared with the numbers of measured samples relating to other transportation operations, the number of measured samples during a predetermined period is equal to or less than a criterion number, or the like);

an elapsed time since measurement of the transportation cost was performed (a predetermined period or longer has elapsed since a last measured sample was obtained, the average value of elapsed times relating to a plurality of measured samples is comparatively long compared with values relating to other transportation operations, or the like);

quality of measurement data (the amount of noise contained in measurement data or the like);

temporal or spatial deviation relating to measurement (measurement time points or measurement locations are biased toward a specific period of time or a specific area, or the like); and an occurrence of an event involving a change in a transportation environment (rearrangement of transportation operators is performed, available transportation routes are changed because of an occurrence of a failure or an accident, or the like).

The smaller is the number of times of measurement of a transportation cost, the lower the correction unit 12 calculates a corrected cost to be. The longer is an (average) elapsed time since (last) measurement of the transportation cost was performed (the older is a measurement time point), the lower the correction unit 12 calculates a corrected cost to be. The lower is quality of measurement data (for example, the amount of noise contained in measurement data is large), the lower the correction unit 12 calculates a corrected cost to be. The larger is the temporal or spatial deviation relating to measurement, the lower the correction unit 12 calculates a corrected cost to be. The larger is influence of an event involving a change in the transportation environment, the lower the correction unit 12 calculates a corrected cost to be.

The presence status acquisition unit 13 acquires information indicating a presence status (presence status information) relating to articles 31 in the input buffer 211 and the output buffer 213 from each transportation source WS 21. The presence status acquisition unit 13 acquires presence status information relating to articles 31 in the input buffer 221 and the output buffer 223 from each transportation destination WS 22. The presence status information is, for example, the amount (number, weight, or the like) of buffer used by articles 31 stored in each buffer. Alternatively, the presence status information is a usage rate of each buffer (a ratio of the amount of buffer used to the maximum amount of articles 31 that can be stored in the buffer (buffer capacity)). Still alternatively, the presence status information may be information representing a difference between a buffer capacity and the amount of buffer used, a ratio of the amount of buffer used to a predetermined criterion value, or the like.

Buffers with respect to which the presence status acquisition unit 13 acquires presence status information may be the buffers of all the workstations or the buffers of some workstations in the transportation operation control system 1. The presence status acquisition unit 13 may set, for example, the buffers of workstations that perform processing on a specific article 31, the buffers of workstations that have small buffer capacities, or the buffers of workstations in which variation (fluctuation) relating to processing capacity is large as buffers with respect to which the acquisition unit 11 acquires presence status information.

It is assumed that each transportation source WS 21 and each transportation destination WS 22 have a function of generating the above-described presence status information and transmitting the generated presence status information to the transportation operation control device 10. In this case, each transportation source WS 21 and each transportation destination WS 22 generate presence status information by using, for example, radio frequency identifications (RFIDs) stuck on articles 31, image recognition using a camera, or a weight scale. Alternatively, each transportation source WS 21 and each transportation destination WS 22 may generate presence status information through input operations by operators. Examples of a method for the input operation include a method in which an operator reads a specific barcode stuck on an article 31, using a mobile terminal or the like every time the operator stores or takes out an article 31 in or from a buffer and transmits the read barcode from the mobile terminal to the presence status acquisition unit 13. The presence status acquisition unit 13 may have a function of generating presence status information.

The calculation unit 14 calculates a importance degree (a degree of priority) of a transportation operation for each combination of a transportation source WS 21 and a transportation destination WS 22, based on presence status information acquired by the presence status acquisition unit 13 and a corrected cost calculated by the correction unit 12. The calculation unit 14 transmits, to a transportation resource 30, information indicating a transportation operation for a combination of a transportation source WS 21 and a transportation destination WS 22 the calculated importance degree of which is the greatest as information indicating a transportation operation that the transportation resource 30 is to perform next. Each transportation resource 30 next performs a transportation operation for a combination of a transportation source WS 21 and a transportation destination WS 22 indicated by information received from the calculation unit 14. A transportation cost relating to a transportation operation performed next is measured by a transportation resource 30, an external device capable of measuring transportation costs, or the transportation cost acquisition unit 11.

The detection unit 15 detects that a transportation operation of an article 31 by a transportation resource 30 from a transportation source WS 21 to a transportation destination WS 22 is completed. The detection unit 15 detects completion of a transportation operation by, for example, monitoring an operational status of the transportation resource 30. More specifically, the detection unit 15 automatically detects completion of a transportation operation by using, for example, passage sensors using infrared rays or ultrasonic waves or laser range finders, image recognition using cameras, or RFIDs stuck on the articles 31 or the like. Alternatively, the detection unit 15 may detect completion of a transportation operation by an input operation, such as pressing down of a button by an operator.

Transportation operations the completion of which is to be detected by the detection unit 15 may be all transportation operations performed in the transportation operation control system 1 or some transportation operations. The detection unit 15 may set, for example, transportation operations performed by transportation resources 30 present within a predetermined region or transportation operations of transporting a specific article 31 (for example, an article that needs to be produced hurriedly) as transportation operations the completion of which is to be detected.

The above-described transportation cost acquisition unit 11, correction unit 12, presence status acquisition unit 13, and calculation unit 14, triggered by detection by the detection unit 15, perform the above-described operations. The calculation unit 14 may perform the above-described operation after a predetermined period has elapsed since the detection unit 15 detected completion of a transportation operation, at a point of time a predetermined period before a time point at which a transportation operation is expected to be completed, or when information indicating that an environment relating to transportation operations has changed is obtained.

Next, operation of the present example embodiment will be described using a specific example.

Figure 2:
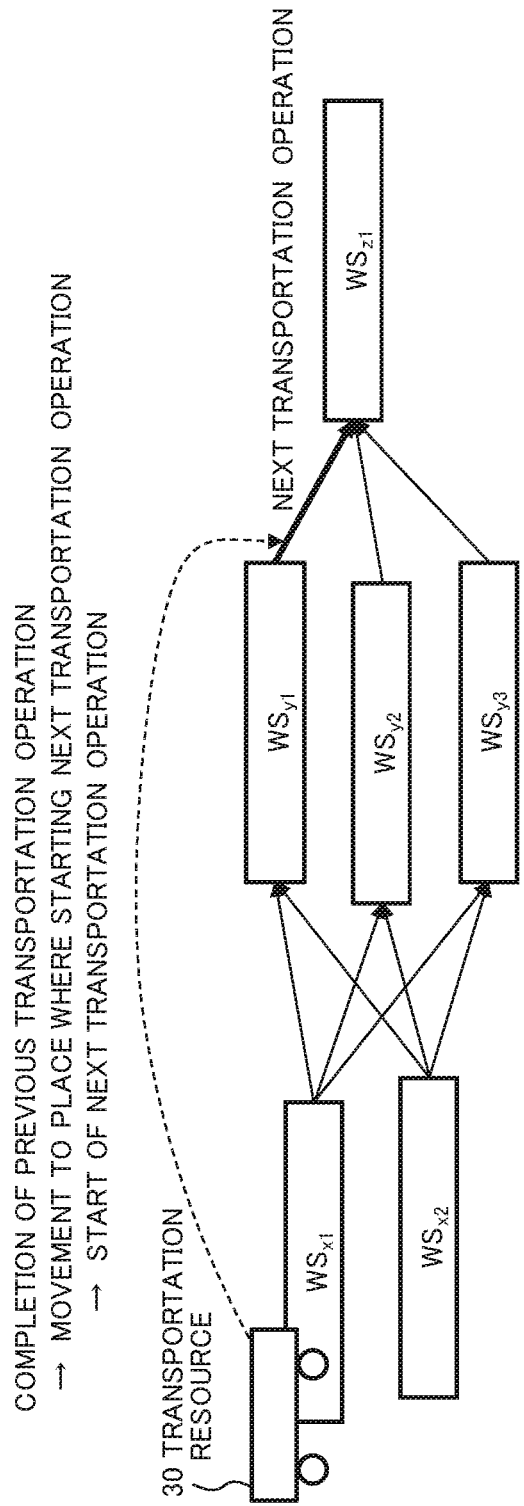
FIG. 2 is a diagram exemplifying a configuration of a network constituted by workstations to be controlled by a transportation operation control device 10 according to the first example embodiment of the present invention.

FIG. 2 is a diagram exemplifying a configuration of a network including workstations to be controlled by the transportation operation control device 10 according to the present example embodiment. In the present example embodiment, it is assumed that six workstations ($WS_{x1}$, $WS_{x2}$, $WS_{y1}$, $WS_{y2}$, $WS_{y3}$, and $WS_{z1}$) are present. It is also assumed that nine links each of which connects any two WSs to each other as the transportation source WS 21 and the transportation destination WS 22 illustrated in FIG. 1 are present. However, the numbers of workstations and links to be controlled by the transportation operation control device 10 are not limited to the above-described numbers.

FIG. 3 is a diagram conceptually exemplifying a configuration of the WS link management table 161 stored in the storage unit 16. The WS link management table 161 exemplified in FIG. 3 is information indicating a list of links between workstations in the network constituted by the workstations exemplified in FIG. 2. The WS link management table 161 associates an identifier of a link, an identifier of a transportation source WS, and an identifier of a transportation destination WS with one another. The WS link management table 161 exemplified in FIG. 3 indicates that, for example, a link relating to $WS_{x1}$, serving as a transportation source WS 21, and $WS_{y1}$, serving as a transportation destination WS 22, is denoted by x1y1. The WS link management table 161 is assumed to be, for example, generated and stored in the storage unit 16 by an administrator of the transportation operation control system 1.

In the present example embodiment, it is assumed that a transportation operation is performed between a transportation source WS and a transportation destination WS in each of the combinations illustrated in FIGS. 2 and 3 and no transportation operation is performed between a transportation source WS and a transportation destination WS in any combination that is not illustrated in FIGS. 2 and 3. In the present example embodiment, it is also assumed that neither a transportation operation from the upstream side with respect to $WS_{x1}$ and $WS_{x2}$ nor a transportation operation to the downstream side with respect to $WS_{z1}$ is performed.

FIG. 4 is a diagram conceptually exemplifying a configuration of the transportation cost identifier management table 162 stored in the storage unit 16. In the present example embodiment, it is assumed that the transportation source WS 21 and the transportation destination WS 22 illustrated in FIG. 1 are in sufficient proximity to each other and, compared with a cost required for a transportation resource 30 to move to a point at which starting a transportation operation, a cost required for the transportation operation itself is thus comparatively negligible. That is, it is, for example, assumed that, in FIG. 2, when a transportation resource 30, which is positioned at the input buffer of $WS_{x1}$ after having completed a transportation operation, next performs a transportation operation with $WS_{y1}$ set as a transportation source WS 21 and $WS_{z1}$ set as a transportation destination WS 22, compared with a cost required for the transportation resource 30 to move from the input buffer of $WS_{x1}$ to the output buffer of $WS_{y1}$, a cost required for the transportation operation from $WS_{y1}$ to $WS_{z1}$ is comparatively negligible.

The transportation cost identifier management table 162 according to the present example embodiment associates an identifier of a transportation cost required for a transportation resource 30 to, in order to perform a next transportation operation, move from a movement origin (a place at which having completed the previous transportation operation) to a movement destination (a place at which starting the next transportation operation), an identifier of a movement origin WS, and an identifier of a movement destination WS with one another. The item referred to as "note" in FIG. 4 is included for the convenience of description. The transportation cost identifier management table 162 exemplified in FIG. 4 indicates that, for example, a transportation cost required for a transportation resource 30 to move from the input buffer of $WS_{x1}$, serving as a movement origin, to the output buffer of $WS_{y1}$, serving as a movement destination, is denoted by $C_{x1y1}$. The transportation cost identifier management table 162 is assumed to be, for example, generated and stored in the storage unit 16 by the administrator of the transportation operation control system 1.

FIG. 5 is a diagram conceptually exemplifying a configuration of the transportation cost measurement management table 163 stored in the storage unit 16. The transportation cost measurement management table 163 is generated or updated by the transportation cost acquisition unit 11 illustrated in FIG. 1. The transportation cost acquisition unit 11 acquires that, for example, a measured value and a measurement time point of a transportation cost required for a transportation resource 30 to move from the input buffer of $WS_{x1}$ to the output buffer of $WS_{y1}$ are "4.9" and "10:55 (10 o'clock 55 minutes)", respectively. The transportation cost acquisition unit 11 acquires that the identifier of the transportation cost is $C_{x1y1}$ by referring to the transportation cost identifier management table 162 exemplified in FIG. 4. With this acquisition, the transportation cost acquisition unit 11 adds a record in which the above-described measurement time point, transportation cost identifier, and transportation cost (measured value) are associated with one another to the transportation cost measurement management table 163.

The transportation costs are values obtained based on predetermined criteria relating to distances that the transportation resources 30 move, periods required for the movements, types of the transportation resources 30 (for example, a platform truck), presence or absence of passage through a place where interference with another transportation operation, production operation, or the like may occur, ease of passage relating to routes taken at the time of movements, and the like. As a criterion relating to ease of passage relating to routes, various criteria, such as whether a route passes through a narrow space, whether there is a slope or a level difference along the way, and whether it is required to use a limited number of elevators, are conceivable. When the transportation cost acquisition unit 11 uses a plurality of criteria in the calculation of a transportation cost, the transportation cost acquisition unit 11 may set, as a transportation cost, a value obtained by multiplying calculation results based on the plurality of criteria by predetermined weights (coefficients) and summing up the weighted values.

The above-described WS link management table 161, transportation cost identifier management table 162, and transportation cost measurement management table 163 may, for example, be generated by the transportation operation control device 10 or an external device, based on a layout diagram or the like of the factory or warehouse. Alternatively, the WS link management table 161, transportation cost identifier management table 162, and transportation cost measurement management table 163 may be generated by operators, a layout designer of the factory or warehouse, or the like. Still alternatively, the WS link management table 161, transportation cost identifier management table 162, and transportation cost measurement management table 163 may be generated by a combination of automatic generation by the transportation operation control device 10 or an external device and information input by operators or the like.

The correction unit 12 illustrated in FIG. 1, as described above, calculates a corrected cost (in the present application, hereinafter, denoted by "C'") obtained by correcting a transportation cost (in the present application, hereinafter, denoted by "C"), which is acquired by the transportation cost acquisition unit 11, based on information representing reliability relating to the transportation cost.

An example of a calculation formula of a corrected cost C', which the correction unit 12 uses, is shown in the equation 1.

$$C'_{ab} = (1-\delta(s_{ab},t_{ab})) \cdot <C_{ab}> \quad \text{(Equation 1)}$$

In the equation 1, however, a and b denote information for identifying workstations and, when, for example, the workstations exemplified in FIG. 2 exist, denote any of x1, x2, y1 to y3, and z1. $C'_{ab}$ denotes a corrected cost relating to a transportation operation from $WS_a$ to $WS_b$. $<C_{ab}>$ denotes an average value of measured values obtained in a plurality of measurements of a transportation cost relating to the transportation operation. $S_{ab}$ denotes the number of samples of measured values relating to the transportation cost. $t_{ab}$ denotes an average elapsed time from measurement time points of the transportation cost to a current time point. $\delta$ is a function that has $s_{ab}$ and $t_{ab}$ as variables and represents a degree of lowness of reliability (that is, a degree of necessity of measurement) relating to the transportation cost Another example of the calculation formula of a corrected cost C' is shown in the equation 2.

$$C'_{ab} = \frac{C_{ab}}{\delta(s_{ab}, t_{ab})} \text{ where } \delta(s_{ab}, t_{ab}) \geq 1 \quad \text{(Equation 2)}$$

The functions $\delta$ in the equations 1 and 2 may be different functions. As shown in the equations 1 and 2, the lower is reliability relating to a transportation cost (that is, the higher is the degree of necessity of measurement), the lower the correction unit 12 calculates a corrected cost to be.

A case where, for example, the correction unit 12 calculates a corrected cost C' by using the above-described equation 1 and using the equation 3 shown below as the function $\delta$ indicated in the equation 1 will be described.

$$\delta(s_{ab}, t_{ab}) = \alpha \left\{ \frac{s_{sum} - s_{ab}}{s_{sum}} + \frac{t_{ab}}{t_{max}} \right\} \quad \text{(Equation 3)}$$

In the equation 3, however, $t_{max}$ denotes a predetermined period. $s_{ab}$ denotes the number of samples of measured values measured during the predetermined period $t_{max}$ with respect to a transportation cost required for a transportation resource 30 to move or transport an article from $WS_a$ to $WS_b$. $s_{sum}$ denotes the total number of samples of measured values that have been measured up to the time of calculation of the corrected cost C' with respect to the transportation cost. $\alpha$ ($\alpha>0$) denotes a predetermined weighting coefficient. In this case, it is assumed that $\alpha=0.2$, $s_{sum}=10$ (pieces), and $t_{max}=100$ (minutes).

FIG. 6 is a diagram conceptually exemplifying a configuration of the corrected cost management table 164 stored in the storage unit 16. The corrected cost management table 164 is generated or updated by the correction unit 12 illustrated in FIG. 1. The corrected cost management table 164 associates a transportation cost identifier, an average value of a transportation cost ($<C_{ab}>$), an average elapsed time ($t_{ab}$) from a measurement time point to a current time point, the number of measurement samples ($s_{ab}$) during a predetermined period, and a corrected cost ($C'_{ab}$) with one another. The ratio of reduction in a corrected cost to a transportation cost (in this case, equivalent to $\delta(s_{ab}, t_{ab})$ as expressed in the equation 1) in FIG. 6 is included for the convenience of description. The correction unit 12 calculates a corrected cost $C'_{ab}$ as illustrated in FIG. 6 by using the equations 1 and 3.

As illustrated in FIG. 6, since an average elapsed time from a measurement time point to a current time point relating to a transportation cost $C_{x1y2}$ is comparatively long (75 minutes has elapsed), a ratio of reduction in a corrected cost to a transportation cost relating to the transportation cost $C_{x1y2}$ is comparatively large (0.25). Since the number of measurement samples during a predetermined period relating to a transportation cost $C_{x1y3}$ is comparatively small (1 piece), a ratio of reduction in a corrected cost to a transportation cost relating to the transportation cost $C_{x1y3}$ is comparatively large (0.28). With regard to all the transportation costs except the transportation costs $C_{x1y2}$ and $C_{x1y3}$, ratios of reduction in corrected costs to transportation costs are 0.2.

To the calculation method of a corrected cost by the correction unit 12, in addition to the example described above, various calculation methods, such as a calculation method using a forgetting curve and a method in which, triggered by an event serving as a factor causing a cost to rapidly change (for example, a change of operators and a change in operation details), recalculation is performed, can be applied.

FIG. 7 is a diagram conceptually exemplifying a configuration of the buffer management table 165 stored in the storage unit 16. The buffer management table 165 is generated or updated by the presence status acquisition unit 13 illustrated in FIG. 1. The buffer management table 165 associates a buffer identifier with a buffer usage rate. With regard to the buffer identifier, I and O denote the input buffer of a workstation and the output buffer of a workstation, respectively. In FIG. 7, for example, $I_{x1}$ and $O_{z1}$ denote the input buffer of $WS_{x1}$ and the output buffer of $WS_{z1}$ illustrated in FIG. 2, respectively.

The calculation unit 14 illustrated in FIG. 1 calculates a importance degree relating to each transportation operation, based on a degree of spatial imbalance (lack of balance) or the like indicated by the above-described presence status information (for example, a usage rate of the output buffer 213 of a transportation source WS 21 and a usage rate of the input buffer 221 of a transportation destination WS 22) and a corrected cost calculated by the correction unit 12. The importance degree is an index indicating a degree of priority of each transportation operation. The calculation unit 14 according to the present example embodiment calculates a importance degree, based on a corrected cost in addition to presence status information.

When, for example, the detection unit 15 detects completion of any transportation operation, the calculation unit 14 calculates a importance degree with respect to each combination (link) between a transportation source WS 21 and a transportation destination WS 22 the importance degree of which is to be calculated. The timing at which the calculation unit 14 calculates degrees of importance may be a point of time when a predetermined period has passed since the completion of any transportation operation or a point of time a predetermined period before a time point at which a transportation operation is expected to be completed. When a predetermined period is required for switching transportation operations, the calculation unit 14 may calculate degrees of importance at a timing determined in consideration of the period. Alternatively, in response to a change in the status of the factory and warehouse (for example, a production apparatus or a transportation devise has malfunctioned or a trouble has occurred in a specific area), the calculation unit 14 may recalculate degrees of importance with suspension of a transportation operation in execution and subsequent start of another transportation operation taken into consideration.

The larger the amount of buffer used (a first amount) or the usage rate (a first usage rate) of the output buffer 213 of a transportation source WS 21 is, the greater the calculation unit 14 calculates a importance degree to be. The smaller the amount of buffer used (a second amount) or the usage rate (a second usage rate) of the input buffer 221 of a transportation destination WS 22 is, the greater the calculation unit 14 calculates a importance degree to be. The smaller a corrected cost obtained by correcting a transportation cost is, the greater the calculation unit 14 calculates a importance degree to be. As described above, the lower reliability of a transportation cost (that is, the higher is the degree of necessity of measurement) is, the smaller the corrected cost is calculated to be by the correction unit 12. Therefore, since the lower reliability of a transportation cost a link has, the greater the calculation unit 14 calculates the importance degree of the link to be, a possibility of the link to be selected as a link for which a transportation operation is performed next increases.

The above-described degree of imbalance relating to buffer usage rates or the like is a value that can be calculated based on a difference or a ratio between a usage rate of the output buffer 213 of a transportation source WS 21 and a usage rate of the input buffer 221 of a transportation destination WS 22, another evaluation function, or the like. The larger is the usage rate of the output buffer 213 of the transportation source WS 21 and the smaller is the usage rate of the input buffer 221 of the transportation destination WS 22, the greater the degree of imbalance relating to the buffer usage rates becomes. The calculation unit 14 may use, as a degree of imbalance relating to the buffer usage rates, values relating to buffer usage rates at an upstream WS (a pre-process site) that is positioned on the upstream side (the pre-process side) with respect to the transportation source WS 21 and a downstream WS (the succeeding process site) that is positioned on the downstream side (the succeeding process side) with respect to the transportation destination WS 22.

When calculating a importance degree, the calculation unit 14 may use a degree of imbalance based on a usage rate of the output buffer 213 of a transportation source WS 21 without using a usage rate of the input buffer 221 of a transportation destination WS 22. Alternatively, the calculation unit 14 may use a degree of imbalance based on a usage rate of the input buffer 221 of a transportation destination WS 22 without using a usage rate of the output buffer 213 of a transportation source WS 21.

An example of a calculation formula of a degree IM of importance, which the calculation unit 14 uses, is shown in the equation 4.

$$IM_{ab} = \frac{O_a - I_b}{C'_{de}} \quad \text{(Equation 4)}$$

In the equation 4, however, a, b, d, and e denote information for identifying workstations and, when, for example, the workstations exemplified in FIG. 2 exist, denote any of x1, x2, y1 to y3, and z1. $IM_{ab}$ denotes a importance degree relating to a transportation operation from $WS_a$ to $WS_b$. $O_a$ denotes a usage rate of the output buffer of $WS_a$ serving as a transportation origin. $I_b$ denotes a usage rate of the input buffer of $WS_b$ serving as a transportation destination. $C'_{de}$ denotes a corrected cost obtained by the correction unit 12 correcting a transportation cost required for a transportation resource 30 to move from the input buffer of $WS_d$ serving as a movement origin (a place at which the previous transportation operation is completed) to the output buffer of $WS_e$ serving as a movement destination (a place at which the next transportation operation is started). The calculation unit 14, as expressed by the equation 4, calculates a degree IM of importance as a difference, per corrected cost, between a usage rate of the output buffer of $WS_a$ serving as a transportation origin and a usage rate of the input buffer of $WS_b$ serving as a transportation destination.

Another example of the calculation formula of a degree IM of importance is shown in the equation 5.

$$IM_{ab} = (O_a - I_b) - \beta C'_{de} \quad \text{(Equation 5)}$$

In the equation 5, however, β (β>0) denotes a predetermined weighting coefficient.

A case where, for example, the calculation unit 14 calculates a degree IM of importance by using the above-described equation 4 will be described.

FIG. 8 is a diagram conceptually exemplifying a configuration of the importance degree management table 166 stored in the storage unit 16. The importance degree management table 166 is generated or updated by the calculation unit 14 illustrated in FIG. 1. The importance degree management table 166 associates a link identifier and a importance degree of a transportation operation with each other. The calculation formulae in FIG. 8 are included for the convenience of description.

The calculation unit 14 acquires a link identifier by referring to the WS link management table 161 exemplified in FIG. 3. The calculation unit 14 acquires a usage rate $O_a$ of the output buffer of $WS_a$ serving as a transportation origin and a usage rate $I_b$ of the input buffer of $WS_b$ serving as a transportation destination by referring to the buffer management table 165 exemplified in FIG. 7. The calculation unit 14 acquires a corrected cost $C'_{de}$ obtained by correcting a transportation cost required for a transportation resource 30 to move from the input buffer of $WS_d$ serving as a movement origin to the output buffer of $WS_e$ serving as a movement destination, by referring to the corrected cost management table 164 exemplified in FIG. 6. The calculation unit 14 calculates a degree $IM_{ab}$ of importance as illustrated in FIG. 8 by using the equation 4.

For example, the calculation unit 14 calculates a degree $IM_{y1z1}$ of importance relating to a transportation operation from $WS_{y1}$ to $WS_{z1}$ as "(100-50)/4=12.5" as indicated by the calculation formula in FIG. 8. However, "I" is an operator representing division. The calculation unit 14 also calculates degrees IM of importance relating to transportation operations with respect to other eight links in a similar manner.

The calculation unit 14 determines a link the degree IM of importance of which is the greatest as a link with respect to which a transportation operation is to be performed next. In the case of the example illustrated in FIG. 8, the link the degree IM of importance of which is the greatest is y1z1. Therefore, the calculation unit 14 determines the transportation operation from $WS_{y1}$ to $WS_{z1}$ as a transportation operation to be performed next.

The calculation unit 14 may be configured to reduce the number of calculations of degrees of importance by, for example, storing a plurality of links in descending order of the degrees of importance in the storage unit 16 as the next and subsequent transportation operations on the occasion of the calculation of degrees of importance.

The calculation unit 14 transmits information indicating a transportation operation that includes information indicating the link identifier and the like relating to the determined next transportation operation to a transportation resource 30. On this occasion, the calculation unit 14 may be configured to transmit, at the same time as the transmission of the information, information indicating a workstation to serve as a movement destination (transportation origin) and a workstation to serve as a transportation destination or, after the transportation resource 30 has moved to (arrived at) the workstation to serve as the movement destination, transmit the information indicating the workstation to serve as the transportation destination to the transportation resource 30.

Each transportation resource 30 may, after receiving information indicating a transportation operation from the calculation unit 14, display, for example, information indicating places at which a transportation source WS 21 and a transportation destination WS 22 are located and a transportation route on a display device (a monitor or the like)

with which the transportation resource 30 is equipped. Alternatively, the transportation resource 30 may present the received information indicating a transportation operation to an operator by sound, using a sound output device (a headphone or the like) with which the transportation resource 30 is equipped. Still alternatively, the transportation resource 30 may display the spatial coordinates of or a marker serving as a guide of a place at which the workstation to serve as a transportation destination is located on the display device.

The transportation resource 30 moves from the input buffer of a movement origin WS ($WS_{x1}$ in the example illustrated in FIG. 2) (a place at which the previous transportation operation is completed) to the output buffer of a movement destination WS (that is, a transportation source WS 21) (a place at which the next transportation operation is to be started) in accordance with the received information indicating a transportation operation. On this occasion, the transportation resource 30 measures a cost required for the movement as a transportation cost. The transportation resource 30, after having moved to the transportation source WS 21 ($WS_{y1}$ in the example illustrated in FIG. 8), transports an article 31 from the output buffer 213 of the transportation source WS 21 to the input buffer 221 of a transportation destination WS 22 ($WS_{z1}$ in the example illustrated in FIG. 8).

Figure 9:
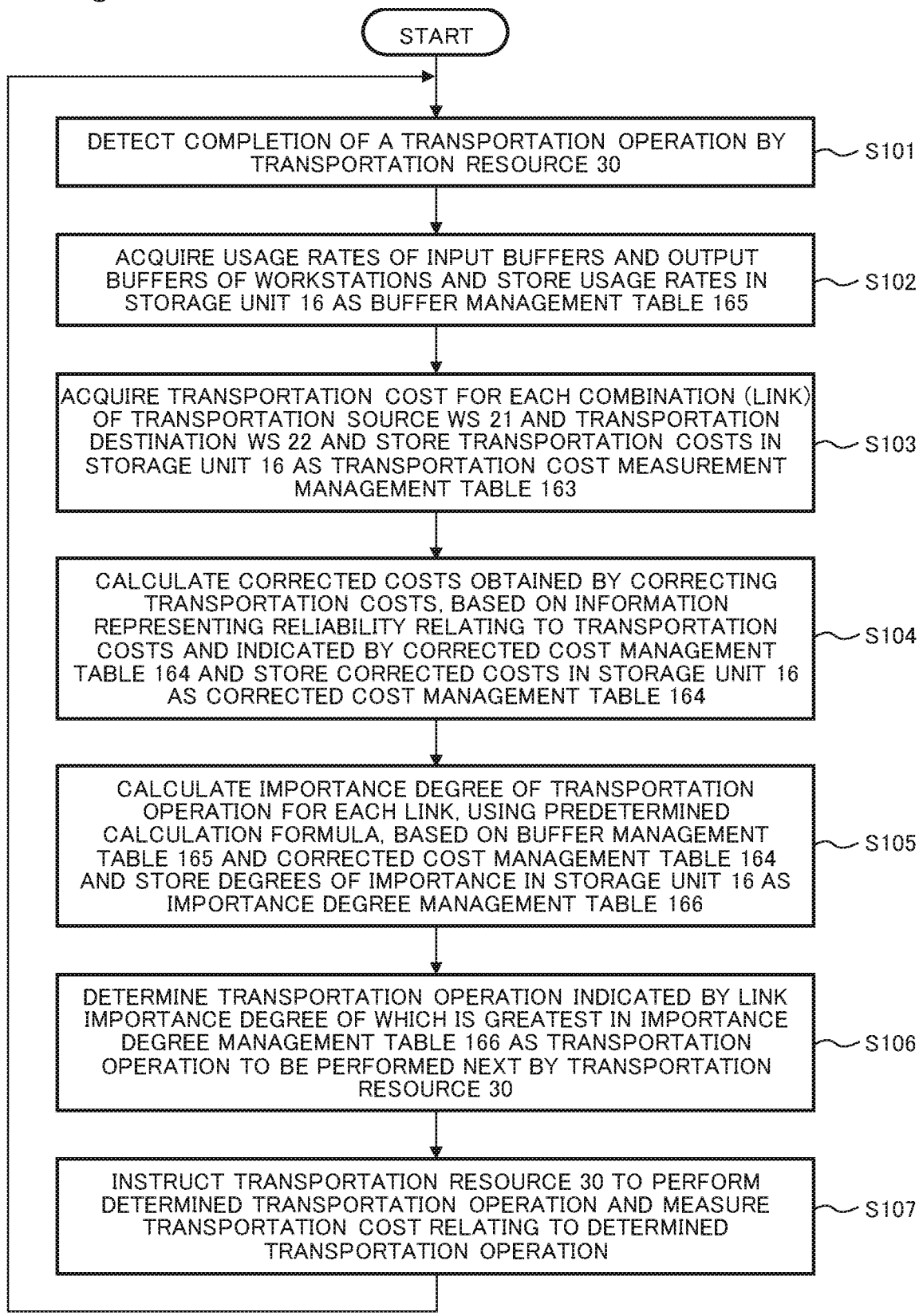
FIG. 9 is a flowchart illustrating operation of the transportation operation control device 10 according to the first example embodiment of the present invention.

Next, with reference to a flowchart in FIG. 9, operation (processing) of the transportation operation control device 10 according to the present example embodiment will be described in detail.

The detection unit 15 detects that a transportation operation by a transportation resource 30 is completed (step S101). The presence status acquisition unit 13 acquires usage rates of the input buffers and the output buffers of the workstations and stores the usage rates in the storage unit 16 as the buffer management table 165 (step S102).

The transportation cost acquisition unit 11 acquires a transportation cost for each combination (link) of a transportation source WS 21 and a transportation destination WS 22 and stores the transportation costs in the storage unit 16 as the transportation cost measurement management table 163 (step S103). The correction unit 12 calculates, based on information representing reliability relating to transportation costs that is indicated by the corrected cost management table 164, corrected costs obtained by correcting the transportation costs and stores the corrected costs in the storage unit 16 as the corrected cost management table 164 (step S104).

The calculation unit 14 calculates a importance degree of a transportation operation for each link, using a predetermined calculation formula, based on the buffer management table 165 and the corrected cost management table 164 and stores the degrees of importance in the storage unit 16 as the importance degree management table 166 (step S105). The calculation unit 14 determines a transportation operation indicated by a link the importance degree of which is the greatest in the importance degree management table 166 as a transportation operation that a transportation resource 30 is to perform next (step S106). The calculation unit 14 instructs the transportation resource 30 to perform the determined transportation operation and to measure a transportation cost relating to the transportation operation (step S107), and the processing returns to step S101.

The transportation operation control device 10 according to the present example embodiment is capable of avoiding a reduction in transportation efficiency of articles in a factory or the like and also surely performing transportation control that can flexibly respond to dynamically fluctuating transportation costs. The reason for the capability is that, when prioritizing a transportation operation having a small transportation cost, the transportation operation control device 10 performs control in such a way as to increase the importance degree (degree of priority) of the transportation operation by, for a transportation operation the transportation cost of which has lower reliability, correcting the transportation cost to a smaller value.

Hereinafter, advantageous effects achieved by the transportation operation control device 10 according to the present example embodiment will be described in detail.

Transportation costs required for transportation operations between sites (workstations) in a factory or the like dynamically change because of various factors. When transportation costs temporally or spatially change dynamically, in order to avoid inappropriately controlling transportation operations, based on transportation costs that are inaccurate (have low reliability), it is required to perceive present transportation costs accurately, that is, to measure present transportation costs accurately.

However, when, for example, measuring present transportation costs accurately is prioritized, there is a problem in that there is a possibility that increase in a cost required for measuring the present transportation costs causes efficiency in production processing and transportation processing in the factory or the like to be reduced. That is, it is a problem to be solved to, without reducing transportation efficiency of articles in a factory or the like, surely perform transportation control that can flexibly respond to dynamically fluctuating transportation costs.

In order to solve such a problem, the transportation operation control device 10 according to the present example embodiment includes the transportation cost acquisition unit 11, the correction unit 12, the presence status acquisition unit 13, and the calculation unit 14 and, for example, operates as described above with reference to FIGS. 1 to 9. That is, the transportation cost acquisition unit 11 acquires a transportation cost obtained from a transportation operation of transporting an article 31 from a transportation source WS 21 to a transportation destination WS 22 among a plurality of workstations (sites) in association with a combination of the transportation source WS 21 and the transportation destination WS 22. The correction unit 12 calculates, based on information representing reliability relating to the transportation cost, a corrected cost obtained by correcting the transportation cost. The presence status acquisition unit 13 acquires presence status information representing presence statuses of articles 31 at the transportation source WS 21 and the transportation destination WS 22. The calculation unit 14 calculates a importance degree of a transportation operation for the combination, based on the presence status information and the corrected cost.

That is, the lower is a transportation cost obtained from a transportation operation relating to a combination of a transportation source WS 21 and a transportation destination WS 22, the higher the transportation operation control device 10 according to the present example embodiment sets a importance degree (degree of priority) of the transportation operation. Since, in general, the transportation costs dynamically change caused by fluctuations in transportation capability, transportation operation details, a transportation load, and the like, reliability of the transportation costs decreases due to measured values of the transportation costs being unable to follow such fluctuations. The transportation operation control device 10 according to the present example embodiment corrects a measured transportation cost to a lower value according to lowness of the reliability in such a way that a transportation operation the transportation cost of which has a low reliability (has a high degree of necessity of updating a value thereof) becomes likely to be selected as a next transportation operation. The transportation operation control device 10 determines degrees of importance of transportation operations, based on corrected costs obtained by correcting transportation costs and a presence status of articles at workstations (such as an occurrence status of lack of balance in articles between the workstations) and determines a transportation operation the importance degree of which is the greatest as a transportation operation to be performed next. This configuration enables the transportation operation control device 10 to surely perform transportation control that can flexibly respond to various fluctuation factors relating to transportation operations without reducing transportation efficiency of articles. That is, the transportation operation control device 10 according to the present example embodiment is enabled to, in an environment in which transportation costs substantially change because of various fluctuation factors, appropriately perform determination of a next transportation operation that enables both acquisition of an accurate transportation cost through efficient measurement and smooth operation relating to production and transportation through reduction in lack of balance in articles between workstations.

The correction unit 12 according to the present example embodiment uses, as information representing reliability relating to transportation costs, various information, such as the number of times of measurement and measurement time points of the transportation costs, the amount of noise contained in measurement data, a degree of deviation relating to measurement time points or measurement locations, and a degree of influence of an event involving a change in an environment relating to transportation operations. This configuration enables the transportation operation control device 10 to correct transportation costs more accurately.

The presence status acquisition unit 13 according to the present example embodiment is capable of acquiring presence status information representing presence statuses of articles 31 at, among a plurality of WSs, an upstream WS (a pre-process site) serving as a transportation origin from which an article 31 is transported to a transportation source WS 21 and a downstream WS (a succeeding process site) serving as a transportation destination to which an article 31 is transported from a transportation destination WS 22. Therefore, the transportation operation control device 10 according to the present example embodiment is capable of performing the above-described control of transportation operations after more holistically perceiving a status of workstations to be controlled.

The transportation cost acquisition unit 11 according to the present example embodiment acquires transportation costs obtained based on various information, such as distances that transportation resources 30 move, periods required for the transportation resources 30 to move, types of the transportation resources 30, a degree of interference occurring between transportation operations and processing performed at a plurality of WSs, and a status of routes relating to transportation operations. Therefore, the transportation operation control device 10 according to the present example embodiment is capable of performing the above-described control of transportation operations, based on more accurate transportation costs.

The calculation unit 14 according to the present example embodiment calculates a importance degree at various timings, such as a timing when a predetermined period has elapsed since the detection unit 15 detected completion of a transportation, at a point of time a predetermined period before a time point at which a transportation operation is expected to be completed, or a timing when information indicating that an environment relating to transportation operations has changed is obtained. Therefore, the transportation operation control device 10 according to the present example embodiment is capable of performing the above-described control of transportation operations more dynamically.

Variation of First Example Embodiment

Next, operation of the transportation operation control system 1 according to the first example embodiment when a precondition relating to transportation costs is different from that in the above-described first example embodiment will be described as a variation of the first example embodiment. That is, in the above-described first example embodiment, it was assumed that the transportation source WS 21 and the transportation destination WS 22 illustrated in FIG. 1 were in sufficient proximity to each other and, compared with a cost required for a transportation resource 30 to move to a point at which starting a transportation operation, a cost required for the transportation operation itself was thus comparatively negligible. In the present variation, conversely to the above case, it is assumed that a transportation source WS 21 and a transportation destination WS 22 illustrated in FIG. 1 are positioned at a certain distance from each other and, compared with a cost required for a transportation operation itself, a cost required for a transportation resource 30 to move to a point at which starting the transportation operation is thus comparatively negligible.

A configuration of a transportation operation control system 1 according to the present variation is as illustrated in FIG. 1 except that a transportation cost identifier management table 162a, a transportation cost measurement management table 163a, and an importance degree management table 166a stored in a storage unit 16 are different from corresponding ones in the above-described first example embodiment. It is assumed that a configuration of a network constituted by workstations to be controlled by a transportation operation control device 10 according to the present variation is, as with the above-described first example embodiment, as exemplified in FIG. 2.

FIG. 10 is a diagram conceptually exemplifying a configuration of the transportation cost identifier management table 162a according to the present variation. The transportation cost identifier management table 162a according to the present variation associates an identifier of a transportation cost required for a transportation resource 30 to transport an article 31 from an output buffer 213 of a transportation source WS 21 to an input buffer 221 of a transportation destination WS 22 and an identifier of a link of the transportation with each other. The item referred to as "note" in FIG. 10 is included for the convenience of description. The transportation cost identifier management table 162a exemplified in FIG. 10 indicates that, for example, a transportation cost required for a transportation resource 30 to transport an article 31 from the output buffer of $WS_{x1}$ serving as a transportation origin to the input buffer of $WS_{y1}$ serving as a transportation destination is denoted by $C_{x1y1}$. The transportation cost identifier management table 162 is assumed to be, for example, generated and stored in the storage unit 16 by the administrator of the transportation operation control system 1.

FIG. 11 is a diagram conceptually exemplifying a configuration of the transportation cost measurement management table 163a according to the present variation. The transportation cost measurement management table 163a is, as with the above-described first example embodiment, generated or updated by a transportation cost acquisition unit 11 illustrated in FIG. 1. The transportation cost acquisition unit 11 acquires that, for example, a measured value and a measurement time point of a transportation cost required for a transportation resource 30 to transport an article 31 from the output buffer of $WS_{x1}$ to the input buffer of $WS_{y1}$ are "2.4" and "14:35 (14 o'clock 35 minutes)", respectively. The transportation cost acquisition unit 11 acquires that an identifier of the transportation cost is $C_{x1y1}$ by referring to the transportation cost identifier management table 162a exemplified in FIG. 10. With this acquisition, the transportation cost acquisition unit 11 adds a record in which the above-described measurement time point, transportation cost identifier, and transportation cost (measured value) are associated with one another to the transportation cost measurement management table 163a.

FIG. 12 is a diagram conceptually exemplifying a configuration of a corrected cost management table 164a according to the present variation. The corrected cost management table 164a, the corrected cost management table 164a, is generated or updated by a correction unit 12 illustrated in FIG. 1. Items included in the corrected cost management table 164a are similar to those in the corrected cost management table 164 exemplified in FIG. 6. The correction unit 12 is, as with the above-described first example embodiment, assumed to calculate a corrected cost $C'_{ab}$ ab by using the equations 1 and 3.

As illustrated in FIG. 12, since an average elapsed time from a measurement time point to a current time point relating to a transportation cost $C_{x2y1}$ is comparatively long (75 minutes has elapsed), a ratio of reduction in a corrected cost to a transportation cost relating to the transportation cost $C_{x2y1}$ is comparatively large (0.25). Since the number of measurement samples during a predetermined period relating to a transportation cost $C_{x2y2}$ is comparatively small (1 piece), a ratio of reduction in a corrected cost to a transportation cost relating to the transportation cost $C_{x2y2}$ is comparatively large (0.28). With regard to all the transportation costs except the transportation costs $C_{x2y1}$ and $C_{x2y2}$, ratios of reduction in corrected costs to transportation costs are 0.2.

FIG. 13 is a diagram conceptually exemplifying a configuration of the importance degree management table 166a according to the present variation. The importance degree management table 166a is generated or updated by a calculation unit 14 illustrated in FIG. 1. Items included in the importance degree management table 166a are the same as those in the importance degree management table 166 exemplified in FIG. 6.

The calculation unit 14, as with the first example embodiment, refers to a WS link management table 161 exemplified in FIG. 3 and a buffer management table 165 exemplified in FIG. 7. The calculation unit 14 acquires a corrected cost $C'_{de}$ obtained by correcting a transportation cost required for a transportation resource 30 to transport an article 31 from the output buffer of $WS_d$ serving as a transportation origin to the input buffer of $WS_e$ serving as a transportation destination, by referring to the corrected cost management table 164a exemplified in FIG. 12. The calculation unit 14 calculates a degree $IM_{ab}$ of importance as illustrated in FIG. 13 by using the equation 4.

For example, the calculation unit 14 calculates a degree $IM_{y2z1}$ of importance relating to a transportation operation from $WS_{y2}$ to $WS_{z1}$ as "(80-50)/1=30" as indicated by the calculation formula in FIG. 13. The calculation unit 14 also calculates degrees IM of importance relating to transportation operations with respect to other eight links in a similar manner.

The calculation unit 14 determines a link the degree IM of importance of which is the greatest as a link with respect to which a transportation operation is to be performed next. In the case of the example illustrated in FIG. 13, the link the degree IM of importance of which is the greatest is y2z1. Therefore, the calculation unit 14 determines the transportation operation from $WS_{y2}$ to $WS_{z1}$ as a transportation operation to be performed next.

The transportation operation control device 10 according to the present variation is capable of avoiding a reduction in transportation efficiency of articles in a factory or the like and also surely performing transportation control that can flexibly respond to dynamically fluctuating transportation costs. The reason for the capability is the same as that described with respect to the first example embodiment.

The transportation cost acquisition units 11 according to the first example embodiment and the variation thereof are capable of acquiring a transportation cost obtained based on a cost required for a transportation resource 30 to, among a plurality of WSs, move from a WS at which the transportation resource 30 is positioned immediately before performing a transportation operation to a transportation source WS 21 at which starting the transportation operation or a cost required for a transportation resource 30 to transport an article 31 from the transportation source WS 21 to a transportation destination WS 22. Therefore, the transportation operation control devices 10 according to the first example embodiment and the variation thereof are capable of performing the above-described transportation control, based on more accurate transportation costs.

Second Example Embodiment

Figure 14:
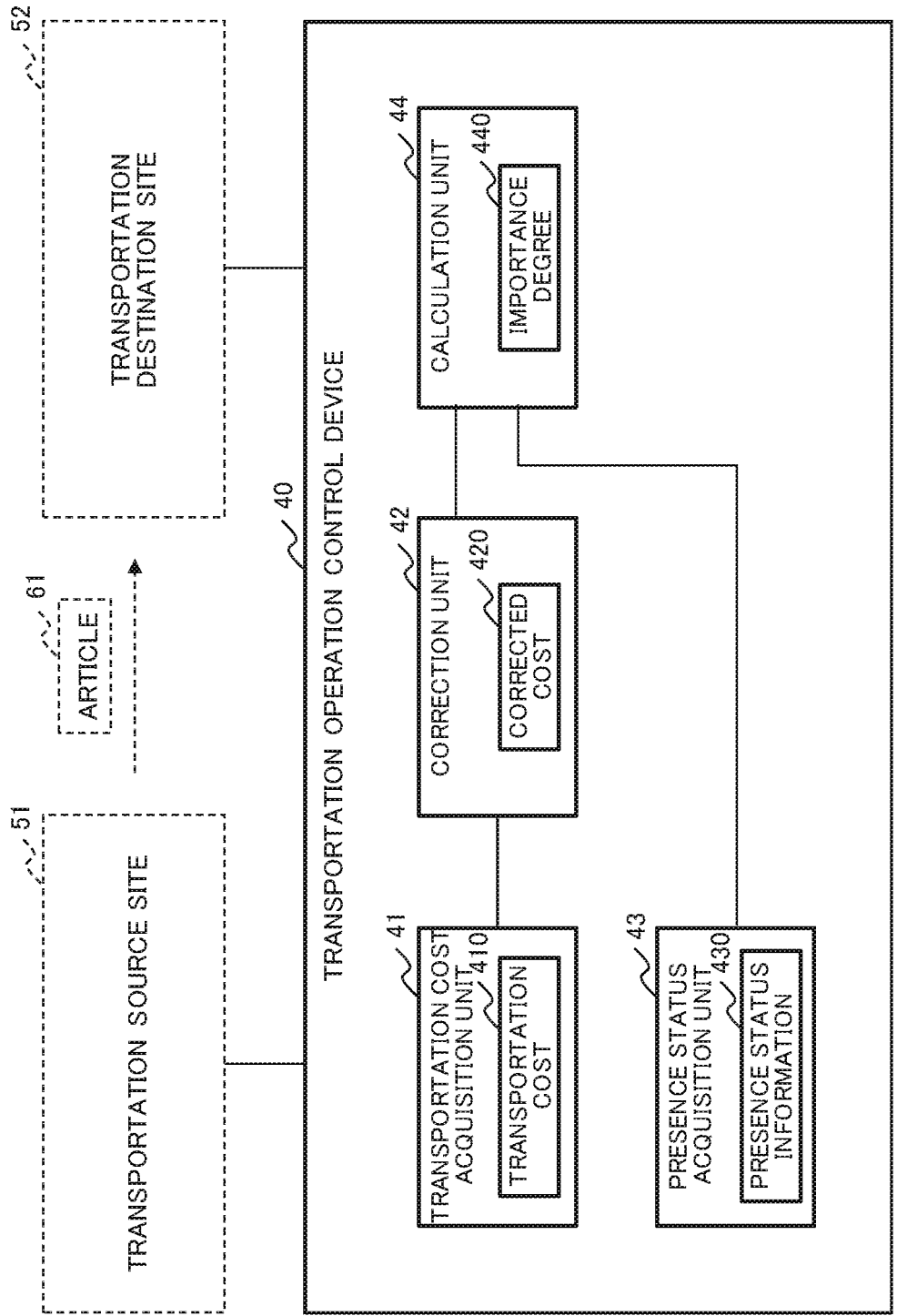
FIG. 14 is a block diagram illustrating a configuration of a transportation operation control device 40 according to a second example embodiment of the present invention.

FIG. 14 is a block diagram conceptually illustrating a configuration of a transportation operation control device 40 according to a second example embodiment of the present invention. The transportation operation control device 40 includes a transportation cost acquisition unit 41, a correction unit 42, a presence status acquisition unit 43, and a calculation unit 44.

The transportation cost acquisition unit 41 acquires a transportation cost 410 obtained from a transportation operation of transporting an article 61 from a transportation source site 51 to a transportation destination site 52 among a plurality of sites in association with a combination of the transportation source site 51 and the transportation destination site 52.

The correction unit 42 calculates, based on information representing reliability relating to the transportation cost 410, a corrected cost 420 obtained by correcting the transportation cost 410.

The presence status acquisition unit 43 acquires presence status information 430 representing presence statuses of articles 61 at the transportation source site 51 and the transportation destination site 52.

The calculation unit 44 calculates a degree 440 of importance of the transportation operation for the combination, based on the presence status information 430 and the corrected cost 420.

The transportation operation control device 40 according to the present example embodiment is capable of avoiding a reduction in transportation efficiency of articles 61 in a factory or the like and also surely performing transportation control that can flexibly respond to dynamically fluctuating transportation costs 410. The reason for the capability is that, when prioritizing a transportation operation having a small transportation cost 410, the transportation operation control device 40 performs control in such a way as to increase the degree 440 of importance of the transportation operation by, for a transportation operation the transportation cost 410 of which has lower reliability, correcting the transportation cost 410 to a smaller value.

Hardware Configuration Example

In the above-described example embodiments, the constituent components of the transportation operation control devices illustrated in FIGS. 1 and 14 can be achieved using dedicated hardware (HW) (electronic circuits). In FIGS. 1 and 14, at least the following constituent components may be viewed as functional (processing) units (software modules) of a software program:

the transportation cost acquisition units 11 and 41;
the correction units 12 and 42;
the presence status acquisition units 13 and 43;
the calculation units 14 and 44; and
the detection unit 15.

However, the division into the constituent components illustrated in the drawings is a configuration for the purpose of description, and various configurations are conceivable at the time of actual implementation. An example of a hardware environment in this case will be described with reference to FIG. 15.

Figure 15:
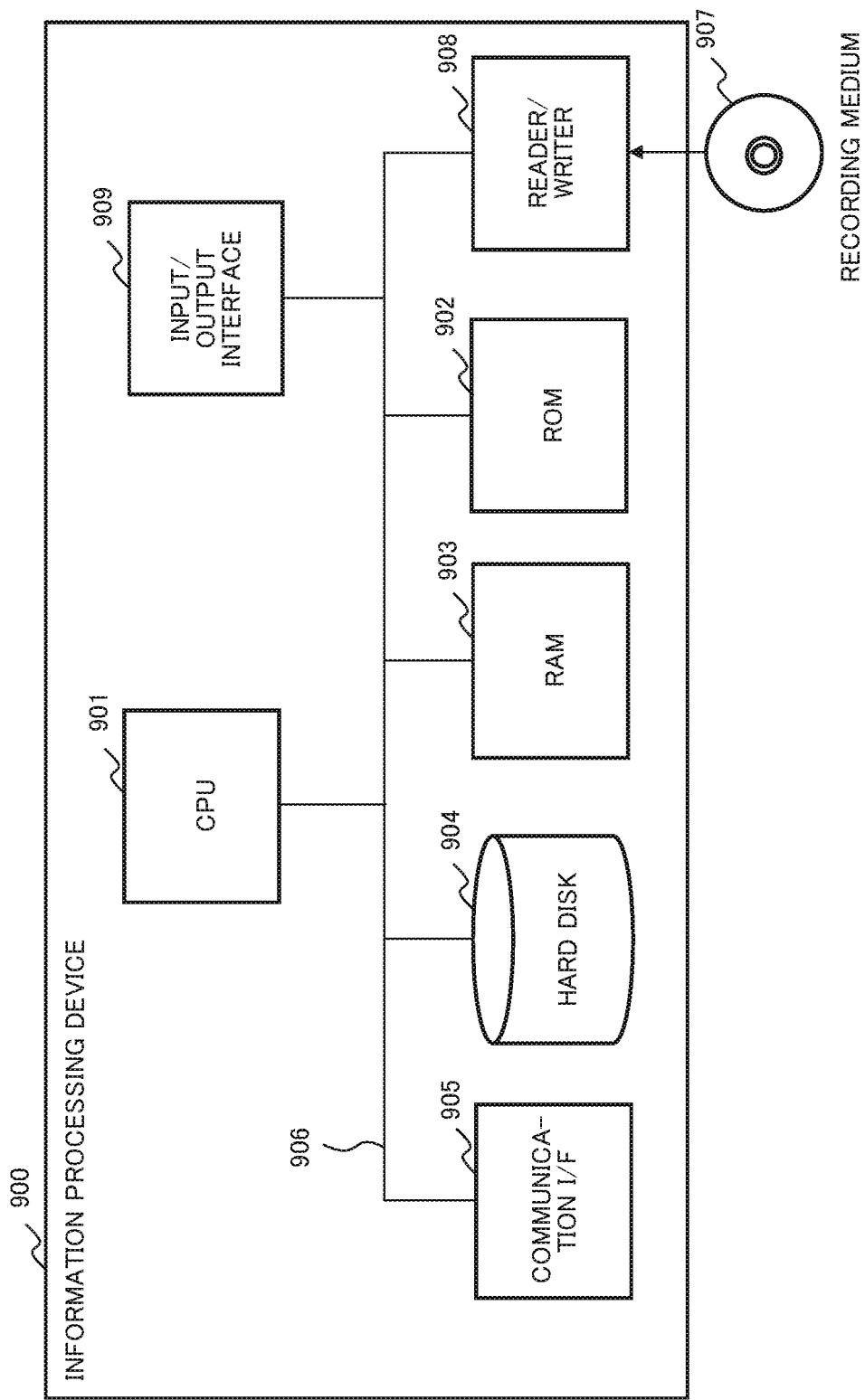
FIG. 15 is a block diagram illustrating a configuration of an information processing device 900 that is capable of executing the transportation operation control devices according to the example embodiments of the present invention.

FIG. 15 is a block diagram describing, in an exemplifying manner, a configuration of an information processing device 900 (computer) that is capable of executing a transportation operation control device according to the example embodiments of the present invention. That is, FIG. 15 illustrates a hardware environment that is a configuration of a computer (information processing device) capable of achieving the transportation operation control devices 10 and 40 illustrated in FIGS. 1 and 14, respectively, and is capable of achieving the functions in the above-described example embodiments.

The information processing device 900 illustrated in FIG. 15 includes the following components as constituent components:

a central processing unit (CPU) 901;
a read only memory (ROM) 902;
a random access memory (RAM) 903;
a hard disk (storage device) 904;
a communication interface 905 for communication with an external device;
a bus 906 (communication line);
a reader/writer 908 capable of reading and writing data stored in a recording medium 907, such as a compact disc read only memory (CD-ROM); and
an input/output interface 909.

That is, the information processing device 900 that includes the above-described constituent components is a general computer in which the components are interconnected via the bus 906. The information processing device 900 includes, in some cases, a plurality of CPUs 901 and, in other cases, a CPU 901 composed of multiple cores.

The present invention, which was described using the above-described example embodiments as examples, provides the information processing device 900 illustrated in FIG. 15 with a computer program that is capable of achieving the following functions. The functions are the above-described configurations in the block configuration diagrams (FIGS. 1 and 14) or the functions in the flowchart (FIG. 13), which were referred to in the descriptions of the example embodiments. The present invention is achieved by subsequently reading out the computer program into the CPU 901 in the hardware and interpreting and executing the computer program. The computer program provided into the device may only be stored in a readable/writable volatile memory (the RAM 903) or a non-volatile storage device, such as the ROM 902 and the hard disk 904.

In the case described afore, a method that is commonly used these days may be employed as a provision method of the computer program into the hardware. Example of such a method include a method of installing the computer program into the device via various recording media 907, such as a CD-ROM, and a method of downloading the computer program from the outside via a communication line, such as the Internet. In such a case, it may be viewed that the present invention is configured with codes composing such a computer program or the recording medium 907 in which the codes are stored.

The invention has been particularly shown and described with reference to example embodiments thereof. However, the invention is not limited to these example embodiments. That is, it will be understood by those of ordinary skill in the art that various changes in form and details may be made therein without departing from the spirit and scope of the present invention as defined by the claims.

All or part of the example embodiments described above may be described as in the following supplementary notes. However, the present invention described exemplarily using the above-described example embodiments is not limited to the following supplementary notes.

(Supplementary Note 1)

A transportation operation control device including:

a transportation cost acquisition means for acquiring a transportation cost in association with a combination of the transportation source site and the transportation destination site, the transportation cost being obtained from a transportation operation of transporting an article from a transportation source site to a transportation destination site among a plurality of sites;

a correction means for calculating, based on information representing reliability relating to the transportation cost, a corrected cost obtained by correcting the transportation cost;

a presence status acquisition means for acquiring presence status information representing presence statuses of the articles at the transportation source site and the transportation destination site; and a calculation means for calculating a importance degree of the transportation operation for the combination, based on the presence status information and the corrected cost.

(Supplementary Note 2)

The transportation operation control device according to supplementary note 1, in which the smaller the number of times of measurement of the transportation cost indicated by the information representing reliability is, the smaller the correction means calculates the corrected cost to be.

(Supplementary Note 3)

The transportation operation control device according to supplementary note 2, in which the smaller the number of times of measurement during a predetermined period is, the smaller the correction means calculates the corrected cost to be.

(Supplementary Note 4)

The transportation operation control device according to any one of supplementary notes 1 to 3, in which the older a measurement time point of the transportation cost indicated by the information representing reliability is, the smaller the correction means calculates the corrected cost to be.

(Supplementary Note 5)

The transportation operation control device according to supplementary note 4, in which when a plurality of the measurement time points exist, the longer an elapsed time since a last measurement time point or the longer is an average value of elapsed times since the plurality of the measurement time points is, the smaller the correction means calculates the corrected cost to be.

(Supplementary Note 6)

The transportation operation control device according to any one of supplementary notes 1 to 5, in which the larger an amount of noise contained in measurement data relating to the transportation cost is, the amount of noise being indicated by the information representing reliability, the smaller the correction means calculates the corrected cost to be.

(Supplementary Note 7)

The transportation operation control device according to any one of supplementary notes 1 to 6, in which the larger a degree of deviation relating to measurement time points or measurement locations of the transportation cost is, the degree of deviation being indicated by the information representing reliability, the smaller the correction means calculates the corrected cost to be.

(Supplementary Note 8)

The transportation operation control device according to any one of supplementary notes 1 to 7, in which the larger a degree of influence of an event involving a change in an environment relating to the transportation cost is, the degree of influence being indicated by the information representing reliability, the smaller the correction means calculates the corrected cost to be.

(Supplementary Note 9)

The transportation operation control device according to supplementary note 8, in which the larger a degree of influence of the event in which a change relating to a transportation resource performing the transportation operation occurred or the event in which a change in a route relating to the transportation operation caused by an occurrence of a failure or an accident occurred is, the smaller the correction means calculates the corrected cost to be.

(Supplementary Note 10)

The transportation operation control device according to any one of supplementary notes 1 to 9, in which the smaller the corrected cost is, the larger the calculation means calculates the importance degree to be.

(Supplementary Note 11)

The transportation operation control device according to any one of supplementary notes 1 to 10, in which the presence status acquisition means acquires presence status information that indicates a first amount relating to the articles that are in a state of waiting for transportation at the transportation source site and a second amount relating to the articles that are in a state of waiting for processing at the transportation destination site, and the larger the first amount or the smaller is the second amount is, the larger the calculation means calculates the importance degree to be.

(Supplementary Note 12)

The transportation operation control device according to supplementary note 11, in which the presence status acquisition means acquires the presence status information that indicates a first usage rate and a second usage rate, the first usage rate indicating a ratio of the first amount to a maximum value of the amount of the articles that can be present in a state of waiting for transportation at the transportation source site, the second usage rate indicating a ratio of the second amount to a maximum value of the amount of the articles that can be present in a state of waiting for processing at the transportation destination site, and the larger the first usage rate or the smaller is the second usage rate is, the larger the calculation means calculates the importance degree to be.

(Supplementary Note 13)

The transportation operation control device according to supplementary note 12, in which the larger a difference between the first amount and the second amount is, the larger a difference between the first usage rate and the second usage rate is, the larger a ratio of the first amount to the second amount is, or the larger a ratio of the first usage rate to the second usage rate is, the greater the calculation means calculates the importance degree to be.

(Supplementary Note 14)

The transportation operation control device according to any one of supplementary notes 11 to 13, in which the presence status acquisition means acquires the presence status information that indicates the numbers or weights of the articles as the first amount and the second amount.

(Supplementary Note 15)

The transportation operation control device according to any one of supplementary notes 1 to 14, in which the presence status acquisition means acquires the presence status information that represents presence statuses of the article at a pre-process site and a succeeding process site among the plurality of sites, the pre-process site serving as a transportation origin from which the article is transported to the transportation source site, the succeeding process site serving as a transportation destination to which the article is transported from the transportation destination site.

(Supplementary Note 16)

The transportation operation control device according to any one of supplementary notes 1 to 15, in which the transportation cost acquisition means acquires the transportation cost obtained based on a cost required for that a transportation resource performing the transportation operation moves, among the plurality of sites, from a site at which the transportation resource was last positioned before the transportation source site to the transportation source site, or a cost required for that the transportation resource transports the article from the transportation source site to the transportation destination site.

(Supplementary Note 17)

The transportation operation control device according to any one of supplementary notes 1 to 16, in which the transportation cost acquisition means acquires the transportation cost obtained based on at least any of a distance that a transportation resource performing the transportation operation moves, a period required for the transportation resource to move, a type of the transportation resource, a degree of interference occurring between the transportation operation and processing performed at the plurality of sites, and a status of a route relating to the transportation operation.

(Supplementary Note 18)

The transportation operation control device according to any one of supplementary notes 1 to 17 further including a detection means for detecting that the transportation operation has been completed, wherein the calculation means calculates the importance degree when a predetermined period has elapsed since the detection means detected completion of the transportation operation, at a predetermined time before a time point at which the transportation operation is expected to be completed, or when information indicating that an environment relating to the transportation operation has changed is obtained.

(Supplementary Note 19)

A transportation operation control system including:

the transportation operation control device according to any one of supplementary notes 1 to 18; and the transportation resource that performs the transportation operation.

(Supplementary Note 20)

The transportation operation control system according to supplementary note 19, in which the calculation means transmits information to a transportation resource performing the transportation operation, the information indicating the transportation operation for the combination whose importance degree is the highest, and the transportation resource next performs the transportation operation for the combination indicated by the information received from the calculation means and also measures the transportation cost relating to the transportation operation.

(Supplementary Note 21)

The transportation operation control system according to supplementary note 19 or 20, in which the transportation resource is a transportation device that transports the article or a terminal device that presents information indicating the transportation operation to an operator who transports the article.

(Supplementary Note 22)

A transportation operation control method including an information processing device performing:

acquiring a transportation cost in association with a combination of the transportation source site and the transportation destination site, the transportation cost being obtained from a transportation operation of transporting an article from a transportation source site to a transportation destination site among a plurality of sites;

calculating, based on information representing reliability relating to the transportation cost, a corrected cost obtained by correcting the transportation cost;

acquiring presence status information representing presence statuses of the articles at the transportation source site and the transportation destination site; and calculating a importance degree of the transportation operation for the combination, based on the presence status information and the corrected cost.

(Supplementary Note 23)

A recording medium in which a transportation operation control program is stored, the program causing a computer to execute:

transportation cost acquisition processing of acquiring a transportation cost in association with a combination of the transportation source site and the transportation destination site, the transportation cost being obtained from a transportation operation of transporting an article from a transportation source site to a transportation destination site among a plurality of sites;

correction processing of calculating, based on information representing reliability relating to the transportation cost, a corrected cost obtained by correcting the transportation cost;

presence status acquisition processing of acquiring presence status information representing presence statuses of the articles at the transportation source site and the transportation destination site; and calculation processing of calculating a importance degree of the transportation operation for the combination, based on the presence status information and the corrected cost.

REFERENCE SIGNS LIST

1 Transportation operation control system
10 Transportation operation control device
11 Transportation cost acquisition unit
12 Correction unit
13 Presence status acquisition unit
14 Calculation unit
15 Detection unit
16 Storage unit
161 WS link management table
162 Transportation cost identifier management table
162a Transportation cost identifier management table
163 Transportation cost measurement management table
163a Transportation cost measurement management table
164 Corrected cost management table
164a Corrected cost management table
165 Buffer management table
166 Importance degree management table
166a Importance degree management table
21 Transportation source WS
211 Input buffer
212 Processing unit
213 Output buffer
22 Transportation destination WS
221 Input buffer
222 Processing unit
223 Output buffer
30 Transportation resource
31 Article
40 Transportation operation control device
41 Transportation cost acquisition unit
410 Transportation cost
42 Correction unit
420 Corrected cost
43 Presence status acquisition unit
430 Presence status information
51 Transportation source site
52 Transportation destination site
61 Article
900 Information processing device
901 CPU
902 ROM
903 RAM
904 Hard disk (storage device)
905 Communication interface
906 Bus
907 Recording medium
908 Reader/writer
909 Input/output interface

What is claimed is:

1. A transportation operation control system comprising:
   a transportation resource; and
   a transportation operation control device including:
   at least one memory storing a computer program; and
   at least one processor configured to execute the computer program to:
   calculate, based on information representing reliability relating to a transportation cost, a corrected cost obtained by correcting the transportation cost, the transportation cost being required for a transportation operation of transporting articles from a transportation source site to a transportation destination site among a plurality of sites;
   calculate an importance degree of the transportation operation for a combination of the transportation source site and the transportation destination site, based on presence status information and the corrected cost, wherein the presence status information represents presence statuses of the articles at the transportation source site and the transportation destination site; and
   control the transportation resource in accordance with the calculated importance degree.

2. The transportation operation control system according to claim 1, wherein the processor is configured to execute the computer program to calculate the corrected cost such that a decrease in a number of times of measurement of the transportation cost indicated by the information representing reliability causes the corrected cost to decrease.

3. The transportation operation control system according to claim 2, wherein the processor is configured to execute the computer program to
   calculate the corrected cost such that a decrease in the number of times of measurement during a predetermined period causes the corrected cost to decrease.

4. The transportation operation control system according to claim 1, wherein the processor is configured to execute the computer program to
   calculate the corrected cost such that an increase in a difference between a current time and a measurement time point of the transportation cost indicated by the information representing reliability causes the corrected cost to decrease.

5. The transportation operation control system according to claim 4, wherein the processor is configured to execute the computer program to
   calculate the corrected cost such that when a plurality of the measurement time points exist, an increase in an elapsed time since a last measurement time point or an increase in an average value of elapsed times since the plurality of the measurement time points causes the corrected cost to decrease.

6. The transportation operation control system according to claim 1, wherein the processor is configured to execute the computer program to
   calculate the corrected cost such that an increase in an amount of noise contained in measurement data relating to the transportation cost, the amount of noise being indicated by the information representing reliability, causes the corrected cost to decrease.

7. The transportation operation control system according to claim 1, wherein the processor is configured to execute the computer program to
   calculate the corrected cost such that an increase in a degree of deviation relating to measurement time points or measurement locations of the transportation cost, the degree of deviation being indicated by the information representing reliability, causes the corrected cost to decrease.

8. The transportation operation control system according to claim 1, wherein the processor is configured to execute the computer program to
   calculate the corrected cost such that an increase in a degree of influence of an event involving a change in an environment relating to the transportation cost, the degree of influence being indicated by the information representing reliability, causes the corrected cost to decrease.

9. The transportation operation control system according to claim 8, wherein the processor is configured to execute the computer program to
   calculate the corrected cost such that an increase in a degree of influence of the event in which a change relating to a transportation resource performing the transportation operation occurred or the event in which a change in a route relating to the transportation operation caused by an occurrence of a failure or an accident occurred is causes the corrected cost to decrease.

10. The transportation operation control system according to claim 1, wherein the processor is configured to execute the computer program to
    calculate the importance degree such that a decrease in the corrected cost causes the importance degree to increase.

11. The transportation operation control system according to claim 1, wherein the processor is configured to execute the computer program to:
    acquire presence status information that indicates a first amount relating to the articles that are in a state of waiting for transportation at the transportation source site and a second amount relating to the articles that are in a state of waiting for processing at the transportation destination site; and
    calculate the importance degree such that an increase in the first amount or a decrease in the second amount causes the importance degree to increase.

12. The transportation operation control system according to claim 11, wherein the processor is configured to execute the computer program to:
    acquire the presence status information that indicates a first usage rate and a second usage rate, the first usage rate indicating a ratio of the first amount to a maximum value of the amount of the articles that can be present in a state of waiting for transportation at the transportation source site, the second usage rate indicating a ratio of the second amount to a maximum value of the amount of the articles that can be present in a state of waiting for processing at the transportation destination site; and
    calculate the importance degree such that an increase in the first usage rate or a decrease in the second usage rate causes the importance degree to increase.

13. The transportation operation control system according to claim 12, wherein the processor is configured to execute the computer program to
    calculate the importance degree such that an increase in a difference between the first amount and the second amount, an increase in a difference between the first usage rate and the second usage rate, an increase in a ratio of the first amount to the second amount, or an increase in a ratio of the first usage rate to the second usage rate causes the importance degree to increase.

14. The transportation operation control system according to claim 11, wherein the processor is configured to execute the computer program to
    acquire the presence status information that indicates numbers or weights of the articles as the first amount and the second amount.

15. The transportation operation control system device according to claim 1, wherein the processor is configured to execute the computer program to acquire the presence status information that represents presence statuses of the article at a pre-process site and a succeeding process site among the plurality of sites, the pre-process site serving as a transportation origin from which the article is transported to the transportation source site, the succeeding process site serving as a transportation destination to which the article is transported from the transportation destination site.

16. The transportation operation control system according to claim 1, wherein the processor is configured to execute the computer program to
    acquire the transportation cost obtained based on a cost required for that a transportation resource performing the transportation operation moves, among the plurality of sites, from a site at which the transportation resource was last positioned before the transportation source site to the transportation source site, or a cost required for that the transportation resource transports the article from the transportation source site to the transportation destination site, the transportation cost including a cost being required for a transportation operation of transporting articles from the site at which the transportation resource was last positioned before the transportation source site to the transportation source site among the plurality of sites.

17. The transportation operation control system according to claim 1, wherein the processor is configured to execute the computer program to
    acquire the transportation cost obtained based on at least any of a distance that a transportation resource performing the transportation operation moves, a period required for the transportation resource to move, a type of the transportation resource, a degree of interference occurring between the transportation operation and processing performed at the plurality of sites, and a status of a route relating to the transportation operation.

18. The transportation operation control system according to claim 1 wherein the processor is configured to execute the computer program to:
    detect that the transportation operation has been completed; and
    calculate the importance degree when a predetermined period has elapsed since completion of the transportation operation is detected, at a predetermined time before a time point at which the transportation operation is expected to be completed, or when obtaining information indicating that an environment relating to the transportation operation has changed.

19. A transportation operation control method comprising an information processing device which communicates with a transportation resource performing:
    calculating, based on information representing reliability relating to a transportation cost, a corrected cost obtained by correcting the transportation cost, the transportation cost being required for a transportation operation of transporting articles from a transportation source site to a transportation destination site among a plurality of sites;
    calculating an importance degree of the transportation operation for a combination of the transportation source site and the transportation destination site, based on presence status information and the corrected cost, wherein the presence status information represents presence statuses of the articles at the transportation source site and the transportation destination site; and
    controlling the transportation resource in accordance with the calculated importance degree.

20. A non-transitory computer-readable recording medium in which a transportation operation control program is stored, the program causing a computer which communicates with a transportation resource to execute:
    calculating, based on information representing reliability relating to a transportation cost, a corrected cost obtained by correcting the transportation cost, the transportation cost being required for a transportation operation of transporting articles from a transportation source site to a transportation destination site among a plurality of sites; and
    calculating an importance degree of the transportation operation for a combination, based on the presence status information and the corrected cost, wherein the presence status information represents presence statuses of the articles at the transportation source site and the transportation destination site; and
    controlling the transportation resource in accordance with the calculated importance degree.

* * * * *